(12) United States Patent
Sparano

(10) Patent No.: US 12,395,652 B2
(45) Date of Patent: Aug. 19, 2025

(54) MANAGEMENT OF ASPECT RATIO IN HIERARCHICAL CODING SCHEMES

(71) Applicant: V-NOVA INTERNATIONAL LIMITED, London (GB)

(72) Inventor: Daniele Sparano, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 95 days.

(21) Appl. No.: 18/248,372

(22) PCT Filed: Oct. 11, 2021

(86) PCT No.: PCT/GB2021/052623
§ 371 (c)(1),
(2) Date: Apr. 7, 2023

(87) PCT Pub. No.: WO2022/074404
PCT Pub. Date: Apr. 14, 2022

(65) Prior Publication Data
US 2023/0379483 A1     Nov. 23, 2023

(30) Foreign Application Priority Data

Oct. 10, 2020   (GB) .................................... 2016115

(51) Int. Cl.
*H04N 19/33*     (2014.01)
*H04N 19/59*     (2014.01)

(52) U.S. Cl.
CPC ............. *H04N 19/33* (2014.11); *H04N 19/59* (2014.11)

(58) Field of Classification Search
CPC ............................... H04N 19/33; H04N 19/59
See application file for complete search history.

(56) References Cited

U.S. PATENT DOCUMENTS

2017/0223368 A1* 8/2017 Abbas .................. H04N 19/187
2022/0377317 A1* 11/2022 Sanchez De La Fuente ...............
                                                H04N 19/167

OTHER PUBLICATIONS

NPL (Text of ISO/IEC FDIS 23000-19 2nd Edition Common Media Application Formation) Sep. 12, 2019 (Cited in IDS dated Aug. 8, 2023).*
International Search Report & Written Opinion for application No. PCT/GB2021/052623 mailed on Feb. 11, 2022.
(Continued)

*Primary Examiner* — James T Boylan
(74) *Attorney, Agent, or Firm* — Workman Nydegger

(57) ABSTRACT

A method of signalling a signal adjustment when encoding an input signal using a hierarchical coding scheme to manage a display aspect ratio. The hierarchical coding scheme comprises encoding a downsampled version of the input signal using a first encoding method to produce a first encoded signal. When the downsampling operation of the hierarchical coding scheme is a non-square downsampling operation, the method signals an adjustment to cause a pixel aspect ratio of the first encoded signal to be adjusted by a scaling factor, wherein the scaling factor is determined from the non-square downsampling operation. Additionally, correction is applied in an enhancement level of the hierarchical coding scheme to ensure that the signalled change of pixel aspect ratio does not lead to unintended consequences in the enhanced reproduction at a decoder-side.

19 Claims, 13 Drawing Sheets

(56) References Cited

OTHER PUBLICATIONS

"Information technology—Generic coding of moving pictures and associated audio information: Video; H.262 (2000) Amendment 4 (Feb. 2012)", ITU-T Standard, International Telecommunication Union, Geneva ; CH, No. Apr. 5, 2014, Feb. 29, 2012 (Feb. 29, 2012), p. 1-238.
Skupin R et al, "AHG17: On Sample Aspect Ratio for RPR", No. JVET-P0450 ; M50418, Oct. 9, 2019.
"Text of ISO/IEC FDIS 23000-19 2nd Edition Common Media Application Format", No. N18636, Sep. 12, 2019.
ITU-T: "ITU-T H.263 Video coding for low bit rate communication", ITU-T Recommendation H.263, Feb. 28, 1998, pp. 1-155.
Office Action received for GB Patent Application No. 2306464.5, mailed on Nov. 29, 2024, 2 pages.

* cited by examiner

MANAGEMENT OF ASPECT RATIO IN HIERARCHICAL CODING SCHEMES

CROSS-REFERENCE TO RELATED APPLICATIONS

This application is a 371 US Nationalization of International Application No. PCT/GB2021/052623, filed Oct. 11, 2021, which claims priority to United Kingdom Patent Application No. 2016115.4, filed Oct. 10, 2020, the disclosures of which are hereby incorporated by reference herein in their entirety.

TECHNICAL FIELD

The present application describes methodologies and apparatuses to manage aspect ratios of output signals when encoded with a hierarchical coding scheme. Particularly, but not exclusively, the application relates to coding with a hierarchical coding scheme using two or more separate and/or independent encoding schemes to encode a base layer and an enhancement layer, such as MPEG-5 Part 2 Low Complexity Enhancement Video Coding (as further described in patent application PCT/GB2020/050695 whose contents are included herein by reference).

BACKGROUND

In a hierarchical coding scheme, such as MPEG-5 Part 2 LCEVC (as further described in patent application PCT/GB2020/050695 published as WO2020188273 and titled "Low Complexity Enhancement Video Coding"), in which an input video signal is first downscaled using a downscaling/downsampling process, the resulting downscaled video is encoded using a first encoding scheme (via a base encoder) to produce an encoded base layer. The resulting encoded base layer is then decoded using a corresponding decoder (implementing a first decoding scheme corresponding to the first encoding scheme) and upscaled using an upscaling/upsampling process to produce a preliminary reconstructed video signal. The resulting preliminary reconstructed video signal is then subtracted from the source video signal to produce a set of residual data, which are optionally encoded using a second encoding scheme (via an enhancement encoder).

At the decoder side, the encoded base layer is also decoded using a corresponding decoder (implementing a first decoding scheme compliant with the first encoding scheme) to produce a decoded base layer, which is suitable for rendering on a display, and which is sometimes output for rendering on a display. The decoded base layer is also upscaled using an upscaling/upsampling process to produce a preliminary reconstructed video signal. This is then combined with the decoded residual data, decoded using a decoder (implementing a second decoding scheme corresponding to the second encoding scheme), to produce a final reconstructed video.

The downsampling can change the ratio of the input video in a "square" manner (i.e., 1:1) or in a non-square manner (e.g., 2:1 for one-dimensional "1D" down-scaling only across the horizontal dimension, or other ratios). Similarly, the upsampling can change the ratio of the input video in a "square" manner (i.e., 1:1) or in a non-square manner (e.g., 2:1 for one-dimensional "1D" up-scaling only across the horizontal dimension, or other ratios).

In the case of a non-square ratio, one or both of the decoded base layer and the final reconstructed video is often displayed wrongly. The present disclosure considers a solution to this problem. In addition, in certain hierarchical coding schema, such as LCEVC, the bitstream of the base layer is different from the bitstream of the enhancement layer, and these two bitstreams are produced according to two separate coding schemes. Accordingly, it may not be possible to easily control how the base layer has been set, and therefore ensuring that the base encoder and enhancement encoder are set appropriately is even more important.

SUMMARY

There are provided methods, devices and computer programs as outlined in the appended claims.

An aim of the disclosure is to provide a solution to the problem of changing aspect ratios in an encoding pipeline, especially in the context of hierarchical coding schemes which alter an aspect ratio of a signal during the coding process. Such an example occurs when the hierarchical coding scheme operates on signals of different resolutions and uses a downsampling operation to move from a first resolution to a second, lower resolution. If the downsampling operation changes the aspect ratio of the signal during the downsampling process, for example by using a non-square downsampling technique, then the final displayed aspect ratio of the signal at the end of the coding pipeline may be undesired and may not match the corresponding aspect ratio of the signal input into the coding pipeline in the first place.

In a first aspect, this disclosure provides the skilled person with an aspect management signalling technique that enables a pixel aspect ratio of the signal to be modified during a coding process, to account for any resolution aspect ratio changes that occur to the signal during the coding process, for example by a non-square downsampling process.

In a second aspect, this disclosure provides the skilled person with an aspect management correction or modification technique that allows an enhanced signal in the hierarchical coding scheme to be corrected or modified to account for any pixel aspect ratio modification signalled by the aforesaid signalling technique. Such a correction comprises signalling through the coding pipeline a pixel aspect ratio, or similar information such as a display aspect ratio, of the original input signal to the coding pipeline, so that a decoding system can use that information to override corresponding information contained in the decoded signal at an enhancement level. Alternatively, such a correction comprises determining a scaling factor in the decoding system itself to alter the information of the decoded output signal, the scaling factor being determined from, for example, an upsampling or other signal modification operation and any resulting change to the resolution aspect ratio of the signal by such a process.

In the first aspect, there is provided a method of signalling a signal adjustment when encoding an input signal using a hierarchical coding scheme to manage a display aspect ratio, wherein the hierarchical coding scheme comprises encoding a downsampled version of the input signal using a first encoding method to produce a first encoded signal. The method comprising, when the downsampling operation of the hierarchical coding scheme is a non-square downsampling operation, signalling an adjustment to cause a pixel aspect ratio of the first encoded signal to be adjusted by a scaling factor, wherein the scaling factor is determined from the non-square downsampling operation. A pixel aspect ratio is the ratio of the width and the height of each pixel in the signal.

A non-square downsampling operation results in a change to the resolution aspect ratio from the input signal to the downsampled version of the input signal, wherein the resolution aspect ratio is the ratio between the width and the height of each frame in the signal, normally measured in pixels.

The scaling factor is a typical embodiment is the ratio of the resolution aspect ratio of the input signal to the resolution aspect ratio of the downsampled version of the input signal.

The pixel aspect ratio of the first encoded signal may be determined from the following equation:

$$PAR_e = PAR_s \times Width_s/Width_e \times Height_e/Height_s$$

where $PAR_e$ is the pixel aspect ratio of the first encoded signal, $PAR_s$ is the pixel aspect ratio of the input signal, and the scaling factor is the ratio of input signal width, $width_s$, to first encoded signal width, $width_e$, multiplied by the ratio of first encoded signal height, $height_e$, to input signal height, $height_s$.

When the encoding system operates in a 1D mode, in which downsampling occurs only across the horizontal dimension of the signal by a ratio of X:1, the scaling factor increases the pixel aspect ratio of the first encoded signal by scaling the horizontal dimension of each pixel by a factor of X, and by not scaling the height dimension. Typically, the 1D mode operates a ratio of 2:1, but other ratios may be used, such as 3:1, 4:1, etc, and non-integer ratios.

The method describes a way of signalling of the adjustment to cause the display aspect ratio of the first encoded signal to be substantially the same as the display aspect ratio of the input signal.

In one particularly common optional embodiment, the step of signalling the adjustment comprises signalling to set the pixel aspect ratio of the first encoded signal to an encoder or encoding module performing the first encoding method. However, the adjustment may be performed earlier in the signal pipeline, and may be performed before downsampling, after downsampling, at the encoder or encoding module, or after encoding by the encoder or encoding module.

In a more detailed embodiment the hierarchical coding scheme may further comprise upsampling a decoded version of the first encoded signal to produce an upsampled decoded signal, wherein the first encoded signal is decoded using a first decoding method corresponding to the first encoding method, producing a residual signal based on a comparison between the input signal and the upsampled decoded signal, and outputting the residual signal. The method further comprises outputting metadata for a decoding system, the metadata comprising information relating to a pixel aspect ratio of the input signal.

The metadata may comprise information relating to a display aspect ratio of the input signal. The metadata may comprise the pixel aspect ratio of the input signal.

Typically, when in the hierarchical coding scheme the upsampling operation is a non-square upsampling operation, often corresponding to the downsampling operation, the method only outputs the metadata when the upsampling operation of the hierarchical coding scheme is non-square. The method may only output the metadata when the downsampling operation of the hierarchical coding scheme is non-square.

The method would typically, but not always, encode the residual signal using a second encoding method prior to outputting.

In some circumstances, it would be useful for the metadata to be transmitted with the residual signal.

In a second aspect, there is provided a method of adjusting a decoded signal, the decoded signal being decoded using a hierarchical coding scheme, wherein the hierarchical coding scheme comprises upsampling a decoded version of an encoded signal to produce an upsampled version of the signal, said decoded version of the signal decoded using a first decoding method, and combining the upsampled version of the signal with a residual signal to produce an output decoded signal, the encoded signal being derived from an input signal. The method comprises adjusting a pixel aspect ratio of the output decoded signal so that the pixel aspect ratio of the output decoded signal matches that of the input signal, the adjustment using one of a pixel aspect ratio or a desired display aspect ratio received as metadata from an encoding system, wherein a display aspect ratio is the aspect ratio of a signal when rendered on a display, and which is derivable from the pixel aspect ratio and a resolution aspect ratio, and a scaling factor derived from the upsampling operation.

The metadata may comprise the pixel aspect ratio of the input signal, and the adjustment may match the pixel aspect ratio of the output decoded signal to the pixel aspect ratio of the input signal.

The scaling factor is typically the ratio of the resolution aspect ratio of the decoded version to the resolution aspect ratio of the upsampled version of the signal.

The metadata or scaling factor in one embodiment is used to cause the output decoded signal to be adjusted only when the upsampling operation is non-square and causes a change to the resolution aspect ratio of the output decoded signal as it passes through the upsampling operation.

The residual signal is often a separate decoded component of the signal, said separate decoded component of the signal being decoded using a second decoding method.

There is provided an encoding module configured to perform the above encoding steps.

There is provided a decoding module configured to perform the above decoding steps.

There is provided a computer program comprising instructions which, when the program is executed by a computer, cause the computer to carry out the above methods.

There is provided a method of adjusting signals in a hierarchical coding scheme, wherein the hierarchical coding scheme comprises, at an encoding system: downsampling an input signal to produce a downsampled version; passing the downsampled version to an encoder so that the encoder produces a first encoded signal; receiving a first decoded version of the first encoded signal from a decoder in the encoding system; upsampling the decoded version to produce an encoder-side reconstruction of the input signal; comparing the encoder-side reconstruction with the input signal to produce a residual signal; and outputting the residual signal for a decoding system to use with the first encoded signal. And wherein the hierarchical coding scheme comprises, at a decoding system: receiving a second decoded version of the first encoded signal from a decoder in the decoding system; upsampling the second decoded version to produce a decoder-side reconstruction of the input signal; and receiving the residual signal and adding the residual signal to the decoder-side reconstruction to produce a decoded output signal. The method comprises, at the encoding system: signalling an adjustment in the encoding system to cause a pixel aspect ratio of the first encoded signal to be adjusted by a scaling factor, wherein the scaling factor is determined from a resolution aspect ratio change caused by the downsampling operation. A pixel aspect ratio is the ratio between the width and the height of each pixel in the signal, and a resolution aspect ratio is the ratio between the width and the height of each picture in the signal. The method further comprises outputting metadata for a decoding system to use when using the residual signal, the metadata comprising the pixel aspect ratio of the input signal or information that allows a decoding system to derive the pixel aspect ratio. The method comprises, at the decoding system: adjusting a pixel aspect ratio of the output decoded signal using the metadata so that the corresponding display aspect ratio for the output decoded signal when rendered on a display matches that of the input signal, wherein the display aspect ratio is the aspect ratio of a signal when rendered on a display, and is derivable from the pixel aspect ratio multiplied by the resolution aspect ratio of a signal.

In one particularly common optional embodiment, the step of signalling the adjustment comprises signalling to set the pixel aspect ratio of the first encoded signal to the encoder. However, the adjustment may be performed earlier in the signal pipeline, and may be performed before downsampling, after downsampling, at the encoder or encoding module, or after encoding by the encoder or encoding module.

There is provided a coding system configured to perform the above method.

BRIEF DESCRIPTION OF THE DRAWINGS

The invention shall now be described, by way of example only, with reference to the accompanying drawings in which.

DETAILED DESCRIPTION

Figure 1:
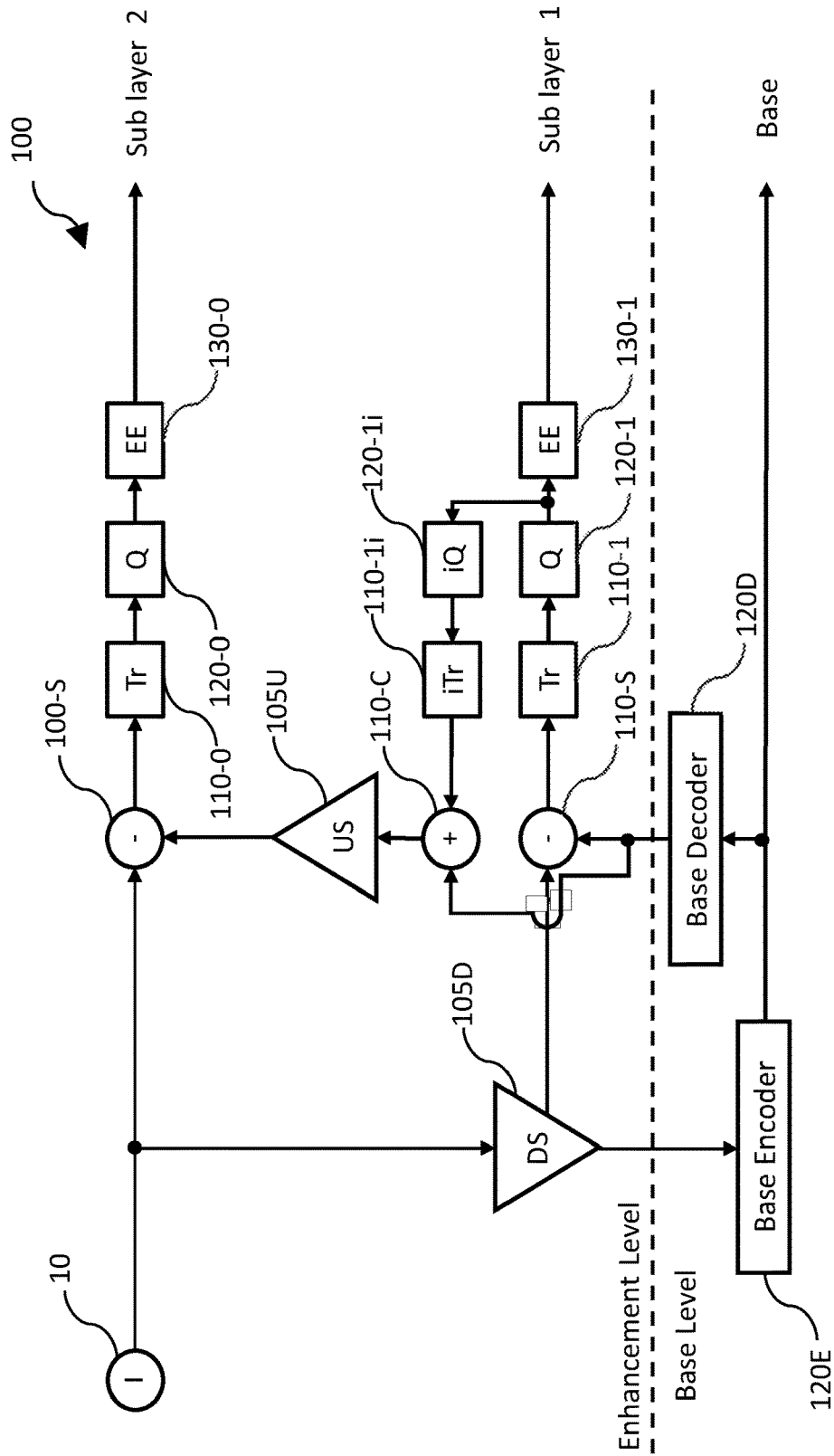
FIG. 1 is a block diagram showing an example hierarchical signal encoding system by way of background information.

By way of background introduction, there is described example hierarchical coding systems with reference to FIGS. 1 to 5.

Examples are presented herein with reference to a signal as a sequence of samples (i.e., two-dimensional images, video frames, video fields, sound frames, etc.). For simplicity, non-limiting embodiments illustrated herein often refer to signals that are displayed as 2D planes of settings (e.g., 2D images in a suitable colour space), such as for instance a video signal. In a preferred case, the signal comprises a video signal. An example video signal is described in more detail with reference to FIG. 4.

The terms "picture", "frame" or "field" will be used interchangeably with the term "image", so as to indicate a sample in time of the video signal: any concepts and methods illustrated for video signals made of frames (progressive video signals) can be easily applicable also to video signals made of fields (interlaced video signals), and vice versa. Despite the focus of embodiments illustrated herein on image and video signals, people skilled in the art can easily understand that the same concepts and methods are also applicable to any other types of multidimensional signal (e.g., audio signals, volumetric signals, stereoscopic video signals, 3DoF/6DoF video signals, plenoptic signals, point clouds, etc.). Although image or video coding examples are provided, the same approaches may be applied to signals with dimensions fewer than two (e.g., audio or sensor streams) or greater than two (e.g., volumetric signals).

In the description the terms "image", "picture" or "plane" (intended with the broadest meaning of "hyperplane", i.e., array of elements with any number of dimensions and a given sampling grid) will be often used to identify the digital rendition of a sample of the signal along the sequence of samples, wherein each plane has a given resolution for each of its dimensions (e.g., X and Y), and comprises a set of plane elements (or "element", or "pel", or display element for two-dimensional images often called "pixel", for volumetric images often called "voxel", etc.) characterized by one or more "values" or "settings" (e.g., by ways of non-limiting examples, colour settings in a suitable colour space, settings indicating density levels, settings indicating temperature levels, settings indicating audio pitch, settings indicating amplitude, settings indicating depth, settings indicating alpha channel transparency level, etc.). Each plane element is identified by a suitable set of coordinates, indicating the integer positions of said element in the sampling grid of the image. Signal dimensions can include only spatial dimensions (e.g., in the case of an image) or also a time dimension (e.g., in the case of a signal evolving over time, such as a video signal). In one case, a frame of a video signal may be seen to comprise a two-dimensional array with three colour component channels or a three-dimensional array with two spatial dimensions (e.g., of an indicated resolution—with lengths equal to the respective height and width of the frame) and one colour component dimension (e.g., having a length of 3). In certain cases, the processing described herein is performed individually to each plane of colour component values that make up the frame. For example, planes of pixel values representing each of Y, U, and V colour components may be processed in parallel using the methods described herein.

Example Coding Systems

FIG. 1 to FIG. 4 show a coding scheme that uses a down-sampled source signal encoded with a base codec, adds a first level of correction or enhancement data to the decoded output of the base codec to generate a corrected picture, and then adds a further level of correction or enhancement data to an up-sampled version of the corrected picture. Thus, the coding scheme may generate an enhancement stream with two spatial resolutions (higher and lower), which may be combined with a base stream at the lower spatial resolution.

In the coding scheme, the methods and apparatuses may be based on an overall algorithm which is built over an existing encoding and/or decoding algorithm (e.g. MPEG standards such as AVC/H.264, HEVC/H.265, etc. as well as non-standard algorithms such as VP9, AV1, and others) which works as a baseline for an enhancement layer. The enhancement layer works accordingly to a different encoding and/or decoding algorithm. The idea behind the overall algorithm is to encode/decode hierarchically the video frame as opposed to using block-based approaches as done in the MPEG family of algorithms. Hierarchically encoding a frame includes generating residuals for the full frame, and then a reduced or decimated frame and so on.

FIG. 1 shows a system configuration for an example encoder 100. The encoding process is split into two halves as shown by the dashed line. Below the dashed line is a base level and above the dashed line is the enhancement level, which may usefully be implemented in software. The encoder 100 may comprise only the enhancement level processes, or a combination of the base level processes and enhancement level processes as needed. The encoder 100 topology at a general level is as follows. The encoder 100 comprises an input I for receiving an input signal 10. The input I is connected to a down-sampler 105D. The down-sampler 105D outputs to a base encoder 120E at the base level of the encoder 100. The down-sampler 105D also outputs to a residual generator 110-S. An encoded base stream is created directly by the base encoder 120E, and may be quantised and entropy encoded as necessary according to the base encoding scheme. The encoded base stream may be referred to as the base layer or base level.

To generate an encoded sub-layer 1 enhancement stream, the encoded base stream is decoded via a decoding operation that is applied at a base decoder 120D. In preferred examples, the base decoder 120D may be a decoding component that complements an encoding component in the form of the base encoder 120E within a base codec. In other examples, the base decoding block 120D may instead be part of the enhancement level. Via the residual generator 110-S, a difference between the decoded base stream output from the base decoder 120D and the down-sampled input video is created (i.e. a subtraction operation 110-S is applied to a frame of the down-sampled input video and a frame of the decoded base stream to generate a first set of residuals). Here, residuals represent the error or differences between a reference signal or frame and a desired signal or frame. The residuals used in the first enhancement level can be considered as a correction signal as they are able to 'correct' a frame of a future decoded base stream. This is useful as this can correct for quirks or other peculiarities of the base codec. These include, amongst others, motion compensation algorithms applied by the base codec, quantisation and entropy encoding applied by the base codec, and block adjustments applied by the base codec.

In FIG. 1, the first set of residuals are transformed, quantized and entropy encoded to produce the encoded sub-layer 1 stream. In FIG. 1, a transform operation 110-1 is applied to the first set of residuals; a quantization operation 120-1 is applied to the transformed set of residuals to generate a set of quantized residuals; and, an entropy encoding operation 130-1 is applied to the quantized set of residuals to generate the encoded sub-layer 1 stream at the first level of enhancement. However, it should be noted that in other examples only the quantisation step 120-1 may be performed, or only the transform step 110-1. Entropy encoding may not be used, or may optionally be used in addition to one or both of the transform step 110-1 and quantisation step 120-1. The entropy encoding operation can be any suitable type of entropy encoding, such as a Huffmann encoding operation or a run-length encoding (RLE) operation, or a combination of both a Huffmann encoding operation and a RLE operation (e.g., RLE then Huffmann or prefix encoding).

To generate the encoded sub-layer 2 stream, a further level of enhancement information is created by producing and encoding a further set of residuals via residual generator 100-S. The further set of residuals are the difference between an up-sampled version (via up-sampler 105U) of a corrected version of the decoded base stream (the reference signal or frame), and the input signal 10 (the desired signal or frame).

Figure 2:
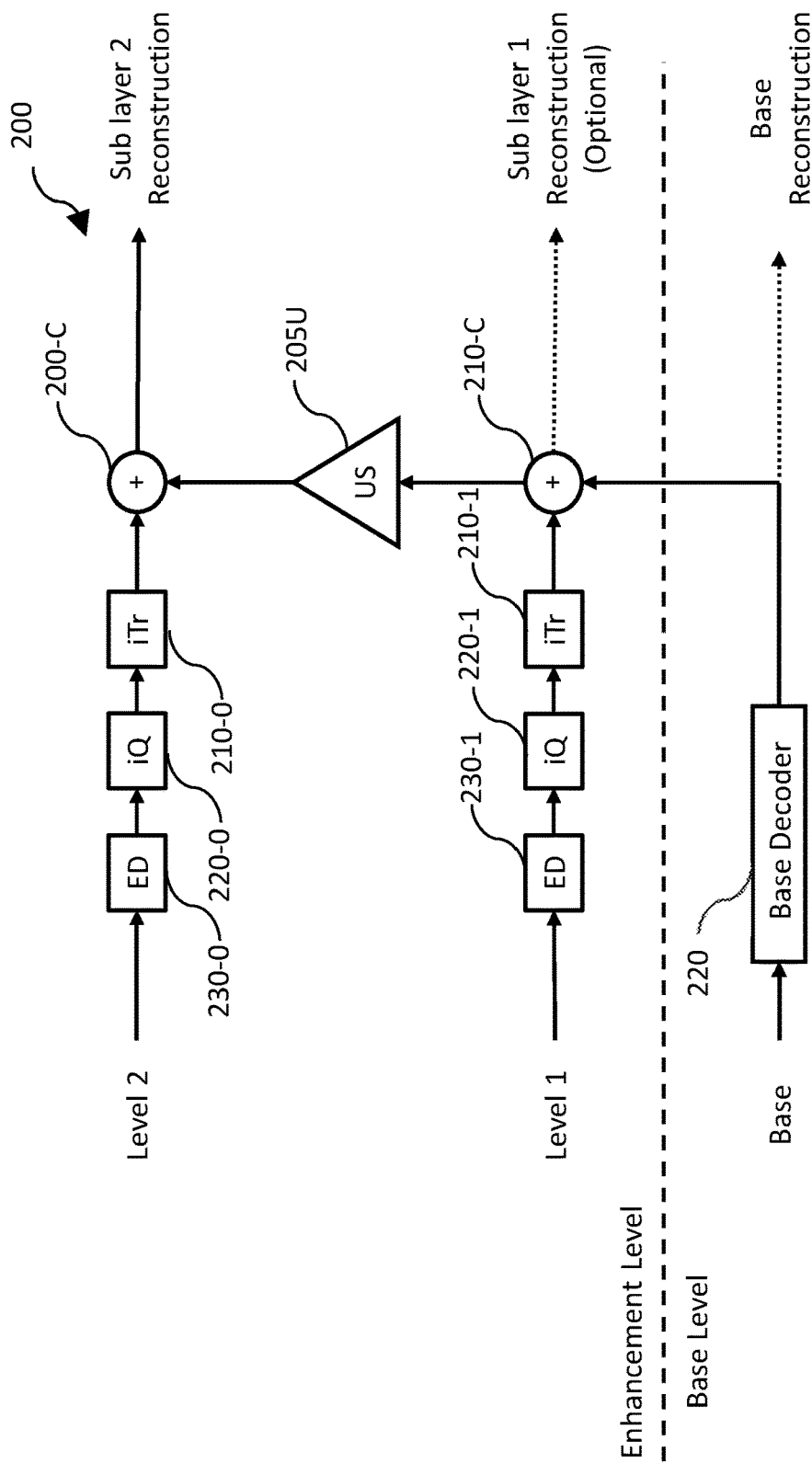
FIG. 2 is a block diagram showing an example hierarchical signal decoding system corresponding to the encoding system of FIG. 1.

To achieve a reconstruction of the corrected version of the decoded base stream as would be generated at a decoder (e.g., as shown in FIG. 2), at least some of the sub-layer 1 encoding operations are reversed to mimic the processes of the decoder, and to account for at least some losses and quirks of the transform and quantisation processes. To this end, the first set of residuals are processed by a decoding pipeline comprising an inverse quantisation block 120-1$i$ and an inverse transform block 110-1$i$. The quantized first set of residuals are inversely quantized at inverse quantisation block 120-1$i$ and are inversely transformed at inverse transform block 110-1$i$ in the encoder 100 to regenerate a decoder-side version of the first set of residuals. The decoded base stream from decoder 120D is then combined with the decoder-side version of the first set of residuals (i.e., a summing operation 110-C is performed on the decoded base stream and the decoder-side version of the first set of residuals). Summing operation 110-C generates a reconstruction of the down-sampled version of the input video as would be generated in all likelihood at the decoder—i.e. a reconstructed base codec video). The reconstructed base codec video is then up-sampled by up-sampler 105U. Processing in this example is typically performed on a frame-by-frame basis.

The up-sampled signal (i.e., reference signal or frame) is then compared to the input signal 10 (i.e., desired signal or frame) to create the further set of residuals (i.e., a difference operation is applied by the residual generator 100-S to the up-sampled re-created frame to generate a further set of residuals). The further set of residuals are then processed via an encoding pipeline that mirrors that used for the first set of residuals to become an encoded sub-layer 2 stream (i.e. an encoding operation is then applied to the further set of residuals to generate the encoded further enhancement stream). In particular, the further set of residuals are transformed (i.e. a transform operation 110-0 is performed on the further set of residuals to generate a further transformed set of residuals). The transformed residuals are then quantized and entropy encoded in the manner described above in relation to the first set of residuals (i.e. a quantization operation 120-0 is applied to the transformed set of residuals to generate a further set of quantized residuals; and, an entropy encoding operation 120-0 is applied to the quantized further set of residuals to generate the encoded sub-layer 2 stream containing the further level of enhancement information). In certain cases, the operations may be controlled, e.g. such that, only the quantisation step 120-1 may be performed, or only the transform and quantization step. Entropy encoding may optionally be used in addition. Preferably, the entropy encoding operation may be a Huffmann encoding operation or a run-length encoding (RLE) operation, or both (e.g., RLE then Huffmann encoding). The transformation applied at both blocks 110-1 and 110-0 may be a Hadamard transformation that is applied to 2×2 or 4×4 blocks of residuals.

The encoding operation in FIG. 1 does not result in dependencies between local blocks of the input signal (e.g., in comparison with many known coding schemes that apply inter or intra prediction to macroblocks and thus introduce macroblock dependencies). Hence, the operations shown in FIG. 1 may be performed in parallel on 4×4 or 2×2 blocks, which greatly increases encoding efficiency on multicore central processing units (CPUs) or graphical processing units (GPUs).

As illustrated in FIG. 1, the output of the encoding process is one or more enhancement streams at an enhancement level which preferably comprises a first level of enhancement and a further level of enhancement. This is then combinable (e.g., via multiplexing or otherwise) with a base stream at a base level. The first level of enhancement (sub-layer 1) may be considered to enable a corrected video at a base level, that is, for example to correct for encoder quirks. The second level of enhancement (sub layer 2) may be considered to be a further level of enhancement that is usable to convert the corrected video to the original input video or a close approximation thereto. For example, the second level of enhancement may add fine detail that is lost during the downsampling and/or help correct from errors that are introduced by one or more of the transform operation 110-1 and the quantization operation 120-1.

FIG. 2 shows a corresponding example decoder 200 for the coding scheme. The encoded base stream is decoded at base decoder 220 in order to produce a base reconstruction of the input signal 10. This base reconstruction may be used in practice to provide a viewable rendition of the signal 10 at the lower quality level. However, the primary purpose of this base reconstruction signal is to provide a base for a higher quality rendition of the input signal 10. To this end, the decoded base stream is provided for sub-layer 1 processing (i.e., sub-layer 1 decoding). Sub-layer 1 processing in FIG. 2 comprises an entropy decoding process 230-1, an inverse quantization process 220-1, and an inverse transform process 210-1. Optionally, only one or more of these steps may be performed depending on the operations carried out at corresponding block 100-1 at the encoder. By performing these corresponding steps, a decoded sub-layer 1 stream comprising the first set of residuals is made available at the decoder 200. The first set of residuals is combined with the decoded base stream from base decoder 220 (i.e., a summing operation 210-C is performed on a frame of the decoded base stream and a frame of the decoded first set of residuals to generate a reconstruction of the down-sampled version of the input video—i.e. the reconstructed base codec video). A frame of the reconstructed base codec video is then up-sampled by up-sampler 205U.

Additionally, and optionally in parallel, the encoded sub-layer 2 stream is processed to produce a decoded further set of residuals. Similar to sub-layer 1 processing, sub-layer 2 processing comprises an entropy decoding process 230-0, an inverse quantization process 220-0 and an inverse transform process 210-0. Of course, these operations will correspond to those performed at block 100-0 in encoder 100, and one or more of these steps may be omitted as necessary. Block 200-0 produces a decoded sub-layer 2 stream comprising the further set of residuals and these are summed at operation 200-C with the output from the up-sampler 205U in order to create a sub-layer 2 reconstruction of the input signal 10, which may be provided as the output of the decoder. Thus, as illustrated in FIGS. 1 and 2, the output of the decoding process may comprise up to three outputs: a base reconstruction, a corrected lower resolution signal and an original signal reconstruction at a higher resolution.

Figure 3:
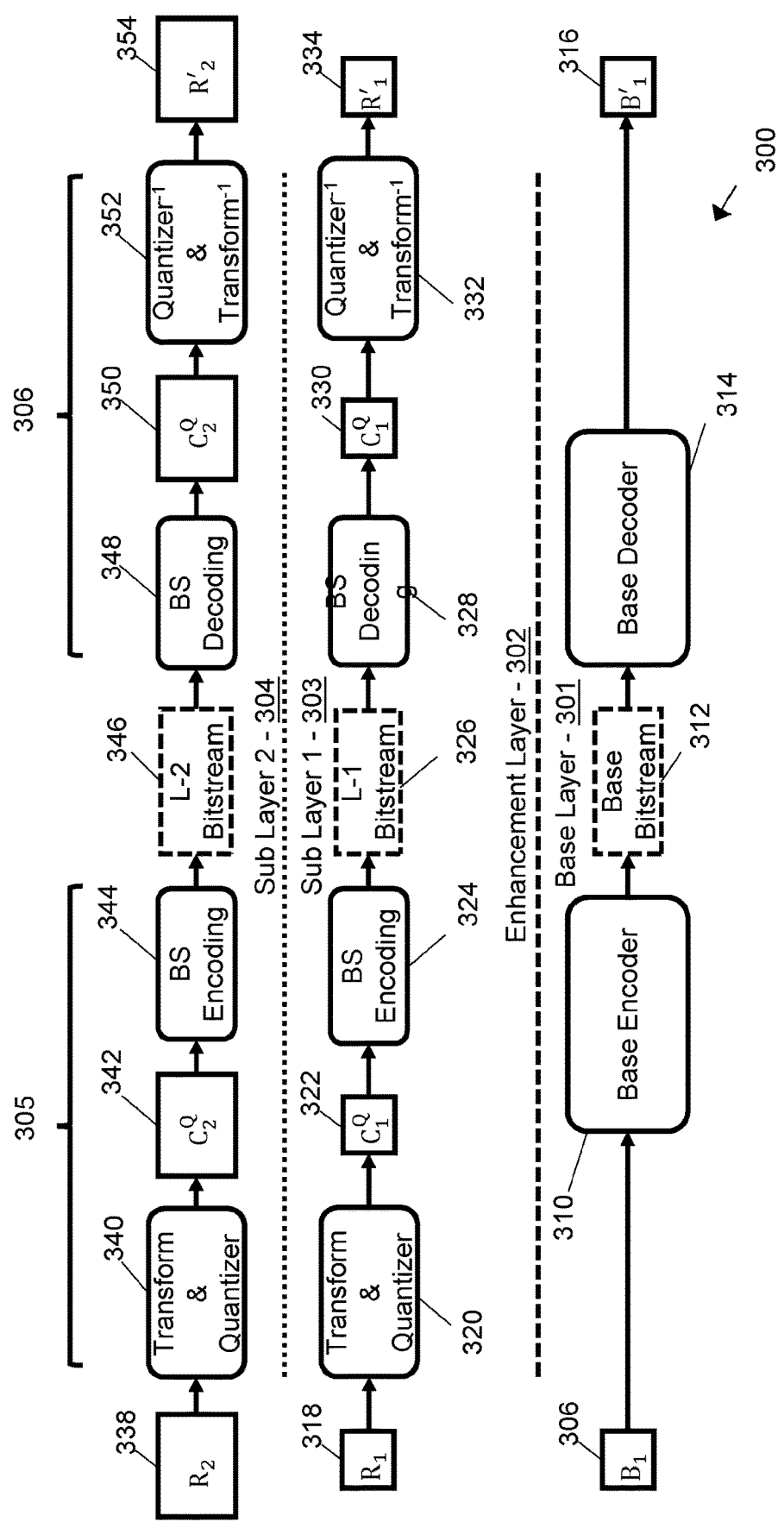
FIG. 3 is a schematic diagram showing generation of an example video bitstream that would be generated by the encoding system of FIG. 1.

FIG. 3 shows an alternative representation of a scheme in the form of example signal coding system 300. The signal coding system 300 is a multi-layer or tier-based coding system, in that a signal is encoded via a plurality of bitstreams that each represent different encodings of the signal at different levels of quality (e.g., different spatial resolutions). In the example of FIG. 3, there is a base layer 301 and an enhancement layer 302. The enhancement layer 302 (and the enhancement layer of FIG. 1 and FIG. 2) may implement an enhancement coding scheme such as LCEVC. LCEVC is described in PCT/GB2020/050695, and the associated standard specification documents including the Draft Text of ISO/IEC DIS 23094-2 Low Complexity Enhancement Video Coding published at MPEG 129 meeting in Brussels, held Monday, 13 Jan. 2020 to Friday, 17 Jan. 2020. Both of these documents are incorporated herein by reference. As per the example of FIG. 1 and FIG. 2, in FIG. 3, the enhancement layer 301 comprises two sub-layers: a first sub-layer 303 and a second sub-layer 304. Each layer and sub-layer may be associated with a specific level of quality. Level of quality as used herein may refer to one or more of: sampling rate, spatial resolution, and bit depth, amongst others. In LCEVC, the base layer 301 is at a base level of quality, the first sub-layer 303 is at a first level of quality and the second sub-layer 304 is at a second level of quality. The base level of quality and the first level of quality may comprise a common (i.e., shared or same) level of quality or different levels of quality. In a case where the levels of quality correspond to different spatial resolutions, such as in LCEVC, inputs for each level of quality may be obtained by downsampling and/or upsampling from another level of quality. For example, the first level of quality may be at a first spatial resolution and the second level of quality may be at a second, higher spatial resolution, where signals may be converted between the levels of quality by downsampling from the second level of quality to the first level of quality and by upsampling from the first level of quality to the second level of quality.

In FIG. 3, corresponding encoder 305 and decoder 306 portions of the signal coding system 300 are illustrated. It will be noted that the encoder 305 and the decoder 306 may be implemented as separate products and that these need not originate from the same manufacturer or be provided as a single combined unit. The encoder 305 and decoder 306 are typically implemented in different geographic locations, such that an encoded data stream is generated in order to communicate an input signal between said two locations. Each of the encoder 305 and the decoder 306 may be implemented as part of one or more codecs—hardware and/or software entities able to encode and decode signals. Reference to communication of signals as described herein also covers encoding and decoding of files, wherein the communication may be within time on a common machine (e.g., by generating an encoded file and accessing it at a later point in time) or via physical transportation on a medium between two devices.

In certain preferred implementations, the components of the base layer 301 may be supplied separately to the components of the enhancement layer 302; for example, the base layer 301 may be implemented by hardware-accelerated codecs whereas the enhancement layer 302 may comprise a software-implemented enhancement codec. The base layer 301 comprises a base encoder 310. The base encoder 310 receives a version of an input signal to be encoded 306, for example a signal following one or two rounds of downsampling and generates a base bitstream 312. The base bitstream 312 is communicated between the encoder 305 and decoder 306. At the decoder 306, a base decoder 314 decodes the base bitstream 312 to generate a reconstruction of the input signal at the base level of quality 316.

Both enhancement sub-layers 303 and 304 comprise a common set of encoding and decoding components. The first sub-layer 303 comprises a first sub-layer transformation and quantisation component 320 that outputs a set of first sub-layer transformed coefficients 322. The first sub-layer transformation and quantisation component 320 receives data 318 derived from the input signal at the first level of quality and applies a transform operation. This data may comprise the first set of residuals as described above. The first sub-layer transformation and quantisation component 320 may also apply a variable level of quantisation to an output of the transform operation (including being configured to apply no quantisation). Quality scalability may be applied by varying the quantisation that is applied in one or more of the enhancement sub-layers. The set of first sub-layer transformed coefficients 322 are encoded by a first sub-layer bitstream encoding component 324 to generate a first sub-layer bitstream 326. This first sub-layer bitstream 326 is communicated from the encoder 305 to the decoder 306. At the decoder 306, the first sub-layer bitstream 326 is received and decoded by a first sub-layer bitstream decoder 328 to obtain a decoded set of first sub-layer transformed coefficients 330. The decoded set of first sub-layer transformed coefficients 330 are passed to a first sub-layer inverse transformation and inverse quantisation component 332. The first sub-layer inverse transformation and inverse quantisation component 332 applies further decoding operations including applying at least an inverse transform operation to the decoded set of first sub-layer transformed coefficients 330. If quantisation has been applied by the encoder 305, the first sub-layer inverse transformation and inverse quantisation component 332 may apply an inverse quantisation operation prior to the inverse transformation. The further decoding is used to generate a reconstruction of the input signal. In one case, the output of the first sub-layer inverse transformation and inverse quantisation component 332 is the reconstructed first set of residuals 334 that may be combined with the reconstructed base stream 316 as described above.

In a similar manner, the second sub-layer 304 also comprises a second sub-layer transformation and quantisation component 340 that outputs a set of second sub-layer transformed coefficients 342. The second sub-layer transformation and quantisation component 340 receives data derived from the input signal at the second level of quality and applies a transform operation. This data may also comprise residual data 338 in certain embodiments, although this may be different residual data from that received by the first sub-layer 303, e.g. it may comprise the further set of residuals as described above. The transform operation may be the same transform operation that is applied at the first sub-layer 303. The second sub-layer transformation and quantisation component 340 may also apply a variable level of quantisation before the transform operation (including being configured to apply no quantisation). The set of second sub-layer transformed coefficients 342 are encoded by a second sub-layer bitstream encoding component 344 to generate a second sub-layer bitstream 346. This second sub-layer bitstream 346 is communicated from the encoder 305 to the decoder 306. In one case, at least the first and second sub-layer bitstreams 326 and 346 may be multiplexed into a single encoded data stream. In one case, all three bitstreams 312, 326 and 346 may be multiplexed into a single encoded data stream. The single encoded data stream may be received at the decoder 306 and de-multiplexed to obtain each individual bitstream.

At the decoder 306, the second sub-layer bitstream 346 is received and decoded by a second sub-layer bitstream decoder 348 to obtain a decoded set of second sub-layer transformed coefficients 350. As above, the decoding here relates to a bitstream decoding and may form part of a decoding pipeline (i.e. the decoded set of transformed coefficients 330 and 350 may represent a partially decoded set of values that are further decoded by further operations). The decoded set of second sub-layer transformed coefficients 350 are passed to a second sub-layer inverse transformation and inverse quantisation component 352. The second sub-layer inverse transformation and inverse quantisation component 352 applies further decoding operations including applying at least an inverse transform operation to the decoded set of second sub-layer transformed coefficients 350. If quantisation has been applied by the encoder 305 at the second sub-layer, the inverse second sub-layer transformation and inverse quantisation component 352 may apply an inverse quantisation operation prior to the inverse transformation. The further decoding is used to generate a reconstruction of the input signal. This may comprise outputting a reconstruction of the further set of residuals 354 for combination with an upsampled combination of the reconstruction of the first set of residuals 334 and the base stream 316 (e.g., as described above).

The bitstream encoding components 324 and 344 may implement a configurable combination of one or more of entropy encoding and run-length encoding. Likewise, the bitstream decoding components 328 and 348 may implement a configurable combination of one or more of entropy encoding and run-length decoding.

Further details and examples of a two sub-layer enhancement encoding and decoding system may be obtained from published LCEVC documentation.

In general, examples described herein operate within encoding and decoding pipelines that comprises at least a transform operation. The transform operation may comprise the DCT or a variation of the DCT, a Fast Fourier Transform (FFT), or a Hadamard transform as implemented by LCEVC. The transform operation may be applied on a block-by-block basis. For example, an input signal may be segmented into a number of different consecutive signal portions or blocks and the transform operation may comprise a matrix multiplication (i.e., linear transformation) that is applied to data from each of these blocks (e.g., as represented by a 1D vector). In this description and in the art, a transform operation may be said to result in a set of values for a predefined number of data elements, e.g. representing positions in a resultant vector following the transformation. These data elements are known as transformed coefficients (or sometimes simply "coefficients").

As described herein, where the signal data comprises residual data, a reconstructed set of coefficient bits may comprise transformed residual data, and a decoding method may further comprise instructing a combination of residual data obtained from the further decoding of the reconstructed set of coefficient bits with a reconstruction of the input signal generated from a representation of the input signal at a lower level of quality to generate a reconstruction of the input signal at a first level of quality. The representation of the input signal at a lower level of quality may be a decoded base signal (e.g. from base decoder 314) and the decoded base signal may be optionally upscaled before being combined with residual data obtained from the further decoding of the reconstructed set of coefficient bits, the residual data being at a first level of quality (e.g., a first resolution). Decoding may further comprise receiving and decoding residual data associated with a second sub-layer 304, e.g. obtaining an output of the inverse transformation and inverse quantisation component 352, and combining it with data derived from the aforementioned reconstruction of the input signal at the first level of quality. This data may comprise data derived from an upscaled version of the reconstruction of the input signal at the first level of quality, i.e. an upscaling to the second level of quality.

Although examples have been described with reference to a tier-based hierarchical coding scheme in the form of LCEVC, the methods described herein may also be applied to other tier-based hierarchical coding scheme, such as VC-6: SMPTE VC-6 ST-2117 as described in PCT/GB2018/053552 and/or the associated published standard document, which are both incorporated by reference herein.

Figure 4:
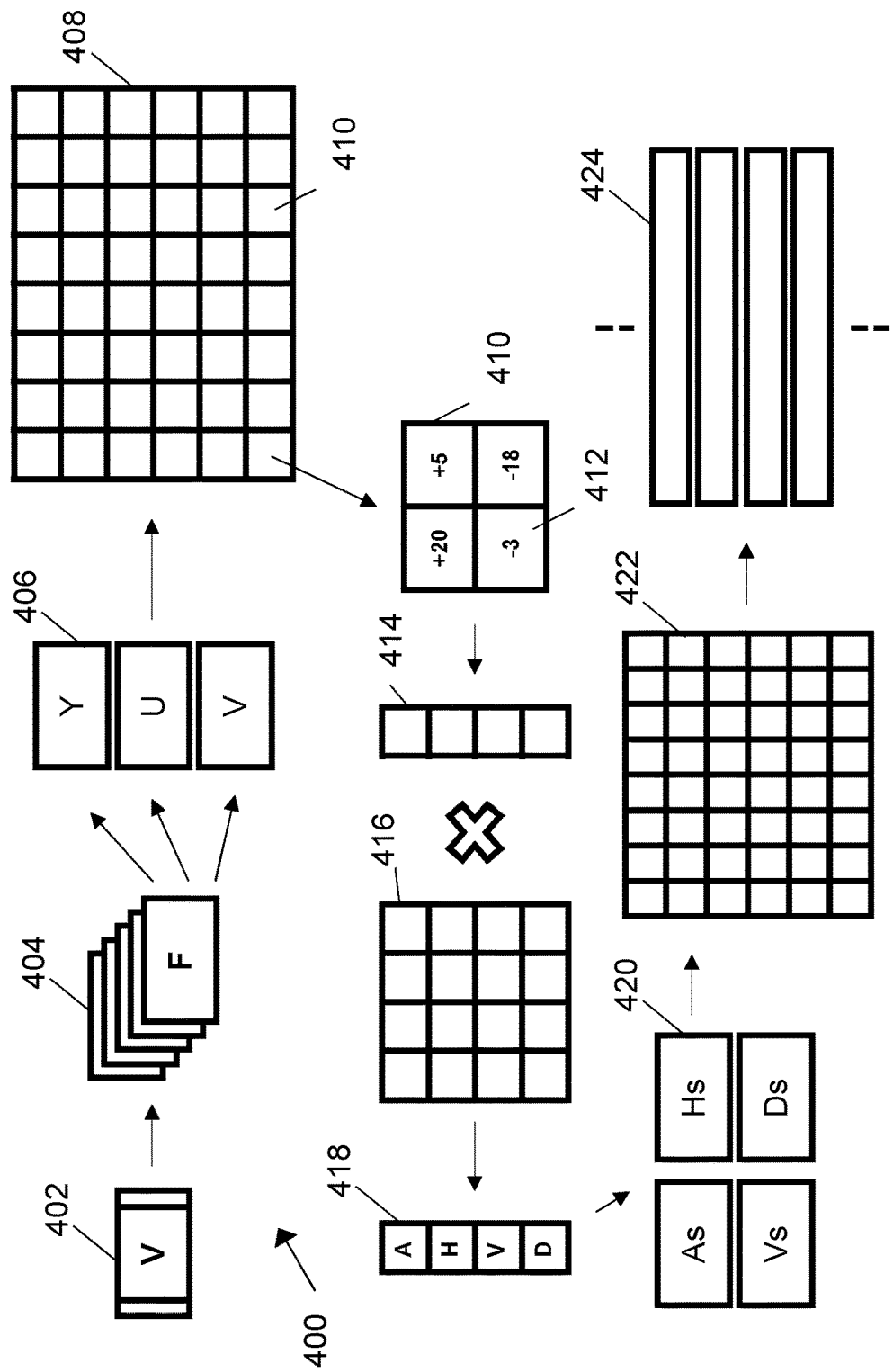
FIG. 4 is a schematic diagram showing different portions of data that may be generated as part of an example video encoding.

FIG. 4 shows how a video signal may be decomposed into different components and then encoded. In the example of FIG. 4, a video signal 402 is encoded. The video signal 402 comprises a plurality of frames or pictures 404, e.g. where the plurality of frames represent action over time. In this example, each frame 404 is made up of three colour components. The colour components may be in any known colour space. In FIG. 4, the three colour components are Y (luma), U (a first chroma opponent colour) and V (a second chroma opponent colour). Each colour component may be considered a plane 408 of values. The plane 408 may be decomposed into a set of n by n blocks of signal data 410. For example, in LCEVC, n may be 2 or 4; in other video coding technologies n may be 8 to 32.

In LCEVC and certain other coding technologies, a video signal fed into a base layer such as 301 is a downscaled version of the input video signal 302. In this case, the signal that is fed into both sub-layers comprises a residual signal comprising residual data. A plane of residual data may also be organised in sets of n by n blocks of signal data 410. The residual data may be generated by comparing data derived from the input signal being encoded, e.g. the video signal 402, and data derived from a reconstruction of the input signal, the reconstruction of the input signal being generated from a representation of the input signal at a lower level of quality. In the example of FIG. 3, the reconstruction of the input signal may comprise a decoding of the encoded base bitstream 312 that is available at the encoder 305. This decoding of the encoded base bitstream 312 may comprise a lower resolution video signal that is then compared with a video signal downsampled from the input video signal 402. The comparison may comprise subtracting the reconstruction from the downsampled version. The comparison may be performed on a frame-by-frame (and/or block-by-block) basis. The comparison may be performed at the first level of quality; if the base level of quality is below the first level of quality, a reconstruction from the base level of quality may be upscaled prior to the comparison. In a similar manner, the input signal to the second sub-layer, e.g. the input for the second sub-layer transformation and quantisation component 340, may comprise residual data that results from a comparison of the input video signal 402 at the second level of quality (which may comprise a full-quality original version of the video signal) with a reconstruction of the video signal at the second level of quality. As before, the comparison may be performed on a frame-by-frame (and/or block-by-block) basis and may comprise subtraction. The reconstruction of the video signal may comprise a reconstruction generated from the decoded decoding of the encoded base bitstream 312 and a decoded version of the first sub-layer residual data stream. The reconstruction may be generated at the first level of quality and may be upsampled to the second level of quality.

Hence, a plane of data 408 for the first sub-layer 303 may comprise residual data that is arranged in n by n signal blocks 410. One such 2 by 2 signal block is shown in more detail in FIG. 4 (n is selected as 2 for ease of explanation) where for a colour plane the block may have values 412 with a set bit length (e.g. 8 or 16-bit). Each n by n signal block may be represented as a flattened vector 414 of length $n^2$ representing the blocks of signal data. To perform the transform operation, the flattened vector 414 may be multiplied by a transform matrix 416 (i.e. the dot product taken). This then generates another vector 418 of length $n^2$ representing different transformed coefficients for a given signal block 410. FIG. 4 shows an example similar to LCEVC where the transform matrix 416 is a Hadamard matrix of size 4 by 4, resulting in a transformed coefficient vector 418 having four elements with respective values. These elements are sometimes referred to by the letters A, H, V and D as they may represent an average, horizontal difference, vertical difference and diagonal difference. Such a transform operation may also be referred to as a directional decomposition. When n=4, the transform operation may use a 16 by 16 matrix and be referred to as a directional decomposition squared.

As shown in FIG. 4, the set of values for each data element across the complete set of signal blocks 410 for the plane 408 may themselves be represented as a plane or surface of coefficient values 420. For example, values for the "H" data elements for the set of signal blocks may be combined into a single plane, where the original plane 408 is then represented as four separate coefficient planes 422. For example, the illustrated coefficient plane 422 contains all the "H" values. These values are stored with a predefined bit length, e.g. a bit length B, which may be 8, 16, 32 or 64 depending on the bit depth. A 16-bit example is considered below but this is not limiting. As such, the coefficient plane 422 may be represented as a sequence (e.g. in memory) of 16-bit or 2-byte values 424 representing the values of one data element from the transformed coefficients. These may be referred to as coefficient bits.

Management of Aspect Ratio in a Hierarchical Coding Scheme

The following terms are used in the following description:

Pixel means an elementary tile, of rectangular shape, of solid colour (also known as a "sample").

Pixel Aspect Ratio (PAR or sometimes referred to as a sample aspect ratio—SAR) means the ratio of the width (w) and the height (h) of a pixel or sample, often expressed as a fraction w/h or w:h.

Picture means a rectangular grid of pixels.

Resolution means a pair of positive integer numbers for respectively the number of pixels in width and height of the picture.

Resolution Aspect Ratio (RAR) means the ratio between the number of pixels in width (w) and height (h) directions of a picture, often expressed as a fraction w/h or w:h.

Display Aspect Ratio (DAR) means the ratio between the picture width (w) and height (h) in their linear dimension as would be displayed by a display.

The triplet PAR, RAR and DAR has two degrees of freedom, meaning given two of them the third parameter is also given.

$$DAR = PAR \times RAR \quad \text{(Equation 1)}$$

By way of example, consider a video source with the following parameters (the subscript s indicates it refers to the "source"):

$$PAR_s = 1:1$$

$$Resolution_s = [Width_s, Height_s] = [4,3]$$

this results in a display aspect ratio:

$$DAR_s = PAR_s \times \frac{width_s}{Height_s} = 4:3$$

[Base Layer Non-Square Downsampling Modification Problem]

Figure 5:
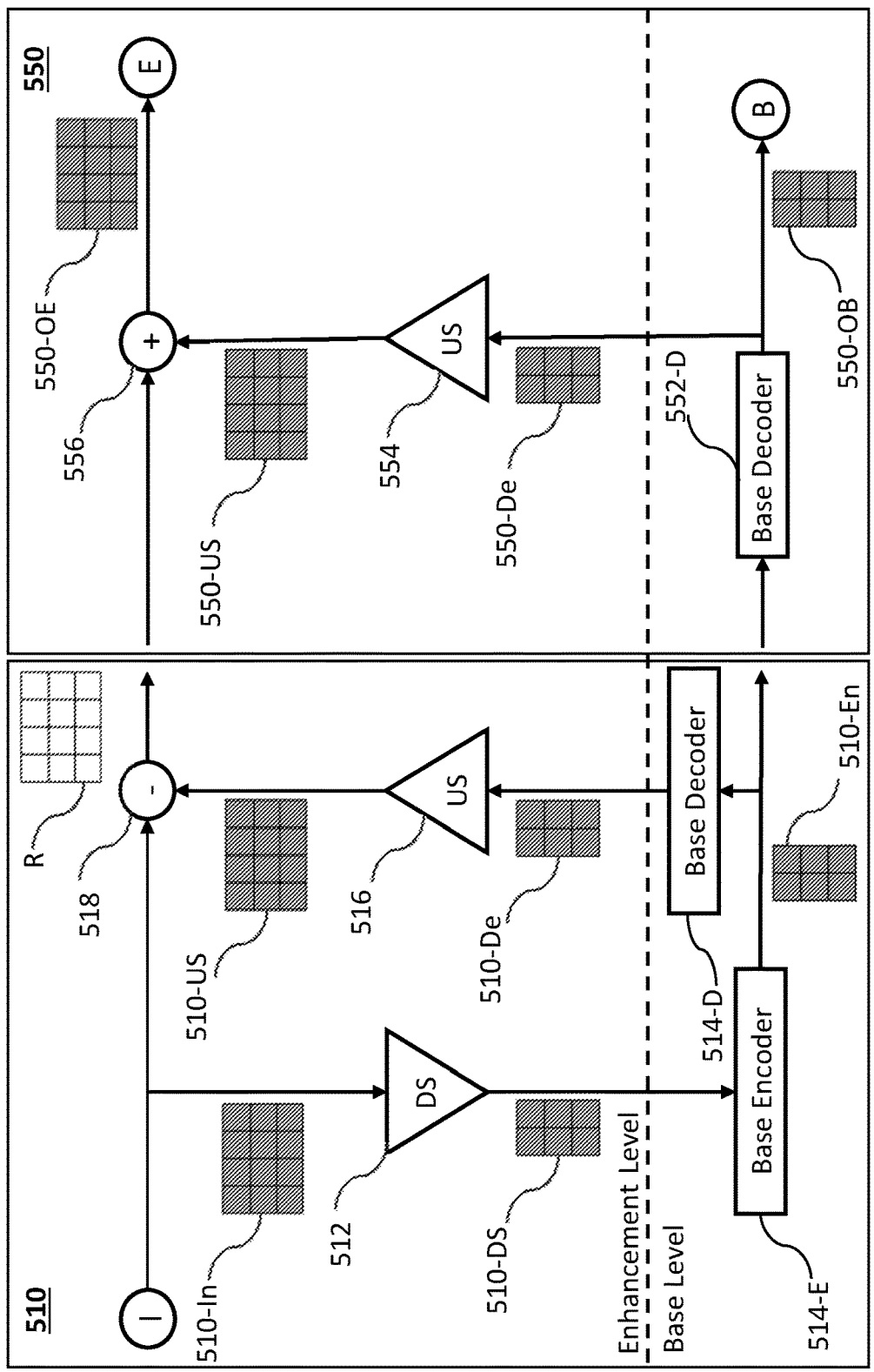
FIG. 5 is a block diagram showing a side-by-side example of an encoding system and a decoding system to illustrate background information suitable for understanding the present disclosure, and a problem that this disclosure aims to solve.

FIG. 5 is a block diagram showing a side-by-side example of an encoding system and a decoding system to illustrate background information suitable for understanding the present disclosure, and a problem that this disclosure aims to solve.

FIG. 5 is similar to but is a more general form of the hierarchical encoding system of FIG. 1 and the corresponding decoding system of FIG. 2, and aims to show a problem that exists at a general level with aspect ratio control in hierarchical coding schemes. FIG. 5 shows an example base level of encoding and decoding, and an example enhancement level of encoding and decoding, together forming a hierarchical coding structure.

While FIG. 5 demonstrates signalling and information transfer between an encoding system 510 and a decoding system 550 in a simplified way, the skilled person would realise that networks and/or storage systems would be used between the encoding system 510 and decoding system 550, as is known in the art.

The encoding system 510 comprises a downsampler 512, a base encoder 514-E, a base decoder 514-D, an upsampler 516, and a comparator 518.

The encoding system 510 operates within a hierarchical coding scheme, and is configured to receive an input signal 510-In and pass the input signal to the downsampler 512 to produce a downsampled version of the input signal 510-DS. The downsampled version of the input signal 510-DS is then passed to base encoder 514-E to produce a first encoded signal 510-En. The first encoded signal 510-En is sometimes referred to as a base layer signal in a hierarchical coding scheme, and this base layer signal forms the basis for the encoded signal that is output from the encoding system 510. Further additional encoding techniques may be applied to this signal as described with reference to FIG. 1 or as known in the prior art. As part of the hierarchical coding scheme, the first encoded signal 510-En is also decoded using base decoder 514-D to produce a decoded version 510-De. The decoded version 510-De is passed to upsampler 516 to produce an upsampled signal 510-US. The upsampled signal 510-US is compared to the input signal 510-In at comparator 518 to produce residual signal R. The residual signal R is in this example a difference between the input signal 510-In and the reconstructed version of the input signal produced by base decoder 514-D and upsampler 516 and is produced on a frame-by-frame basis. The residual signal R may be further processed or encoded, as would be known to those skilled in the art, or output in a raw format. This type of hierarchical encoding scheme advantageously allows for the parallel processing of frames within the input signal, and for flexibility in the processing of data. The base layer signal and the residual signal, in raw or processed/encoded form, together form the hierarchically-encoded signal output from the encoding system 510. A decoding system, such as decoding system 550, is able to decode the hierarchically-encoded signal, either in part by decoding the base layer signal, or in full by using the residual signal in addition to the base layer signal.

The example decoding system 550 of FIG. 5 comprises a base decoder 552-D, an upsampler 554 and a combine module 556.

The decoding system 550 is configured to receive the hierarchically-encoded signal output from the encoding system 510, either directly or indirectly via networks or other storage or transmission means. The decoding system 550 is configured to operated according to the hierarchical coding scheme to decode the first encoded signal 510-En using base decoder 552-D to produce a decoded version of the first encoded signal. The base decoder 552-D is configured to output a decoded version of the base signal 550-De for passing to upsampler 554 to produce an upsampled version of the decoded base signal 550-US. At combine module 556, the upsampled version 550-US is combined with residual signal R obtained from the received hierarchically-encoded signal to produce output decoded signal 550-OE which is at an enhanced level of quality that is higher than the base level of quality. The residual signal R may be received in raw form or encoded form, and if received in encoded form the decoding system 550 is configured to decode the residual signal R, typically using a decoding scheme that differs from the decoding scheme employed by base decoder 552-D.

Additionally, decoding system 550 is arranged to output base output signal 550-OB, which is a decoded version of the first encoded signal 510-En using base decoder 552-D, at a base level of quality for optionally rendering on a display, should it be inappropriate to use the enhanced level of quality signal 550-OE, for example because a particular decoding system does not have the enhancement level capability, or because bandwidth limitations on the signal being received by the decoding system mean that the enhancement level information cannot be transmitted to or received by the decoding system.

As can be observed in FIG. 5 from the representations of the various signals 510-xx and 550-xx, the aspect ratio of the base output signal 550-OB is different to the aspect ratio of the input signal 510-In. In this example, it is the display aspect ratio that differs because of a non-square downsampling operation performed at downsampler 512. Therefore, when the base output signal 550-OB is rendered on a display, the rendered signal would very likely display incorrectly (that is, at the wrong aspect ratio) giving a poor viewing experience.

In general, a downsampling operation can change the resolution aspect ratio of an input signal in a "square" manner by preserving the original aspect ratio of the signal, (i.e., 1:1) or in a non-square manner in which one dimension is downsampled disproportionately to the other dimension (e.g., 2:1 for one-dimensional "1D" down-scaling in which the samples, or pixels, are reduced in number by half across the horizontal dimension but are preserved in whole across the height dimension). Other ratios of non-square downsampling exist, and the 2:1 ratio is an example only. Similarly, an upsampling operation can change the ratio of the input video in a "square" manner (i.e., 1:1) or in a non-square manner (e.g., 2:1 for one-dimensional "1D" up-scaling only across the horizontal dimension, or other ratios).

In the specific example of FIG. 5, the representations of the various signals 510-xx and 550-xx denote each pixel by a single box within a matrix of boxes. In this example, the input signal 510-In has 12 pixels arranged in a resolution of 4×3, and therefore having an aspect ratio (RAR) of 4:3. The pixel aspect ratio (PAR) of the input signal is 1:1. Together, the RAR and PAR can be used to determine the display aspect ratio (DAR) for the signal upon rendering on a display, which is 4:3 from equation 1. Ideally, output signals 550-OB and 550-OE from 550 should each have a DAR of 4:3 so that they will be rendered by a display to match the intended DAR of the input signal to the encoding system 510. In the example of FIG. 5, the base output signal 550-OB has a DAR of 2:3 because of the non-square downsampling operation at downsampler 512, and so the DAR of the base output signal 550-OB is not the same as the input signal 510-In. This is clearly problematic when rendering the base output signal 550-OB.

As mentioned, the mismatched DAR of the output decoded signal 550-OB is due to the downsampler 512 which, in this example, downsamples in a non-square manner. One practical example of non-square downsampling is when the encoding system and decoding system operate in a so-called 1D mode, in which downsampling occurs only across the horizontal dimension of the signal by a ratio of 2:1. As such, the downsampled signal 510-DS has a RAR of 2:3 (different from the RAR of the input signal 510-In, which is 4:3). This changed RAR cascades through the encoding and decoding pipeline, causing a problem of mismatched aspect ratios between the base output signal 550-OB and the input signal 510-In, which is only corrected by the upsampling operations at upsampler 516 and upsampler 554, assuming that these upsamplers are working in the corresponding mode, for example in the 1-D mode. Occasionally, a particular upsampler 554 in a decoding system 550 may not operate in the correct mode, and in that case the output signal 550-OE may also have a rendered DAR which does not match the input signal 510-In.

A first aspect of the invention focuses on ensuring that the rendered aspect ratio of the base output signal 550-OB matches the corresponding aspect ratio of the input signal 510-In. A second aspect of the invention focuses on ensuring that the rendered aspect ratio of the enhanced output signal 550-OE matches the corresponding aspect ratio of the input signal 510-In.

Figure 6:
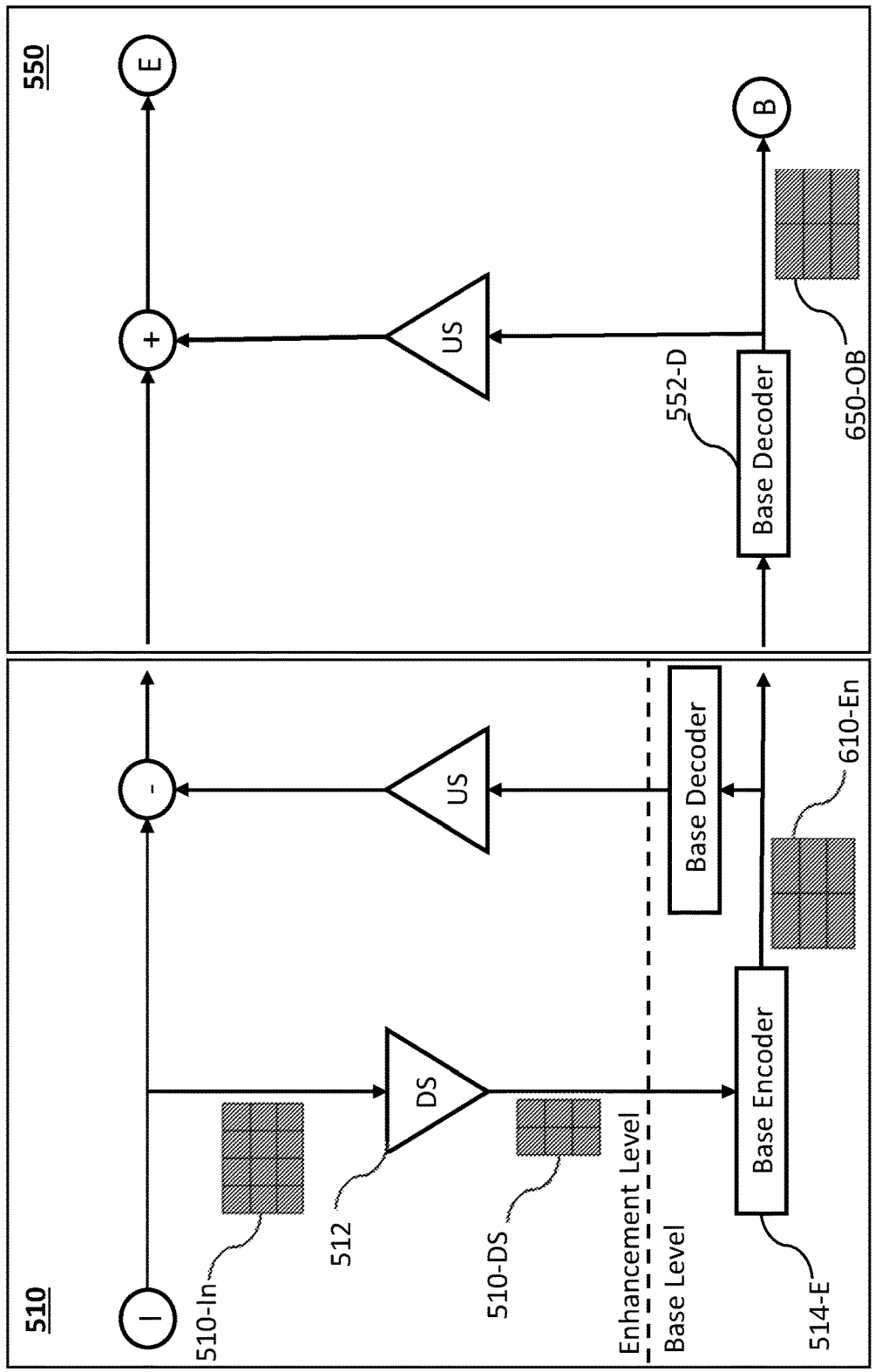
FIG. 6 is a block diagram showing the encoding system and decoding system of FIG. 5, modified according to a first aspect of the invention to control an aspect ratio of a base encoded signal.

FIG. 6 is a block diagram showing the encoding system and decoding system of FIG. 5, modified according to a first aspect of the invention to control an aspect ratio of a base encoded signal. Only the differences between FIG. 5 and FIG. 6 are described, and FIG. 6 uses the same reference signs for like components and signals. FIG. 6 illustrates how to match an aspect ratio of the base encoded signal 550-OB at the decoding system 550 and the input signal 510-In at the encoding system 510.

In FIG. 6, an aspect ratio of the base level signal 610-En leaving the encoding system 510 has been adjusted by a scaling factor. In this way, the aspect ratio of the base level signal can be controlled through the coding pipeline to final rendition at a display via decoding system 550 in a reliable and predictable way. In this example embodiment, the aspect ratio that is adjusted is the pixel aspect ratio.

As can be seen from the signal representation 610-En of FIG. 6, the encoded signal 610-En produced at the base encoder 514-E has a different PAR to the first encoded signal 510-En produced in FIG. 5. The encoded signal 510-En of FIG. 5 has a PAR of 1:1, whereas the adjusted base encoded signal 610-En of FIG. 6 has a PAR of 2:1 (i.e. 2 units width to 1 unit height). The modification of the PAR produces an encoded base level signal 610-En that has a correspondingly modified DAR. This modification in turn feeds through the coding pipeline to the decoding system 550 and the decoded base level signal 650-OB which shares the modified PAR with signal 610-En. Signal 650-OB prompts a display which is to render the signal 650-OB to render such a signal at a DAR substantially matching that of the input signal 510-In, even though the RAR of the two signals is different (4:3 versus 2:3). This is due to the modified PAR, which results in a display being asked to render each pixel with dimensions of 2 units width to 1 unit height, compensating for the difference in the RARs.

In more detail, in a 1D LCEVC encoding of the input signal 510-In, the base encoding will have a RAR that has half the horizontal width and same vertical height of the source. In order to maintain the same DAR this results in a change in the PAR by a factor of 2.

This is translated in the following parameters for the base encoded signal (the subscript "e" stands for "encoded"):

$$DAR_e = DAR_s = 4:3$$

$$\text{Resolution}_e = [\text{Width}_e, \text{Height}_e] = [2, 3]$$

$$PAR_e = DAR_e / \frac{\text{Width}_e}{\text{Height}_e} = \frac{4}{3} \times \frac{3}{2} = 2:1$$

As more general relationship between source PAR and encoded PAR:

$$DAR_e = DAR_s \Rightarrow PAR_e \times \frac{\text{Width}_e}{\text{Height}_e} = PAR_s \times \text{Width}_s / \text{Height}_s \quad \text{(Equation 2)}$$

Where $$\text{Width}_e = \text{Width}_s / N \quad \text{(Equation 3)}$$

$$\text{Height}_e = \text{Height}_s / M \quad \text{(Equation 4)}$$

Therefore $$PAR_e = PAR_s \times \text{Width}_s / \text{Width}_e \times \text{Height}_e / \text{Height}_s = PAR_s \times N/M \quad \text{(Equation 5)}$$

As such, when a non-square downsampling/upsampling ratio is used, the base encoder shall adjust the PAR of the base stream by a scaling factor (e.g. N/M) with respect to value of PAR of the source signal. In particular, it shall set it to be N/M times the value of the PAR of the source signal. For example, in the example above (i.e., in the case of a 2:1 down-sampling/up-scaling), it should be twice the value of PAR of the source video. If there is a double downsampling process (i.e., in the case of a 2:1 down-sampling/up-scaling twice), that factor should be four.

Figure 7:
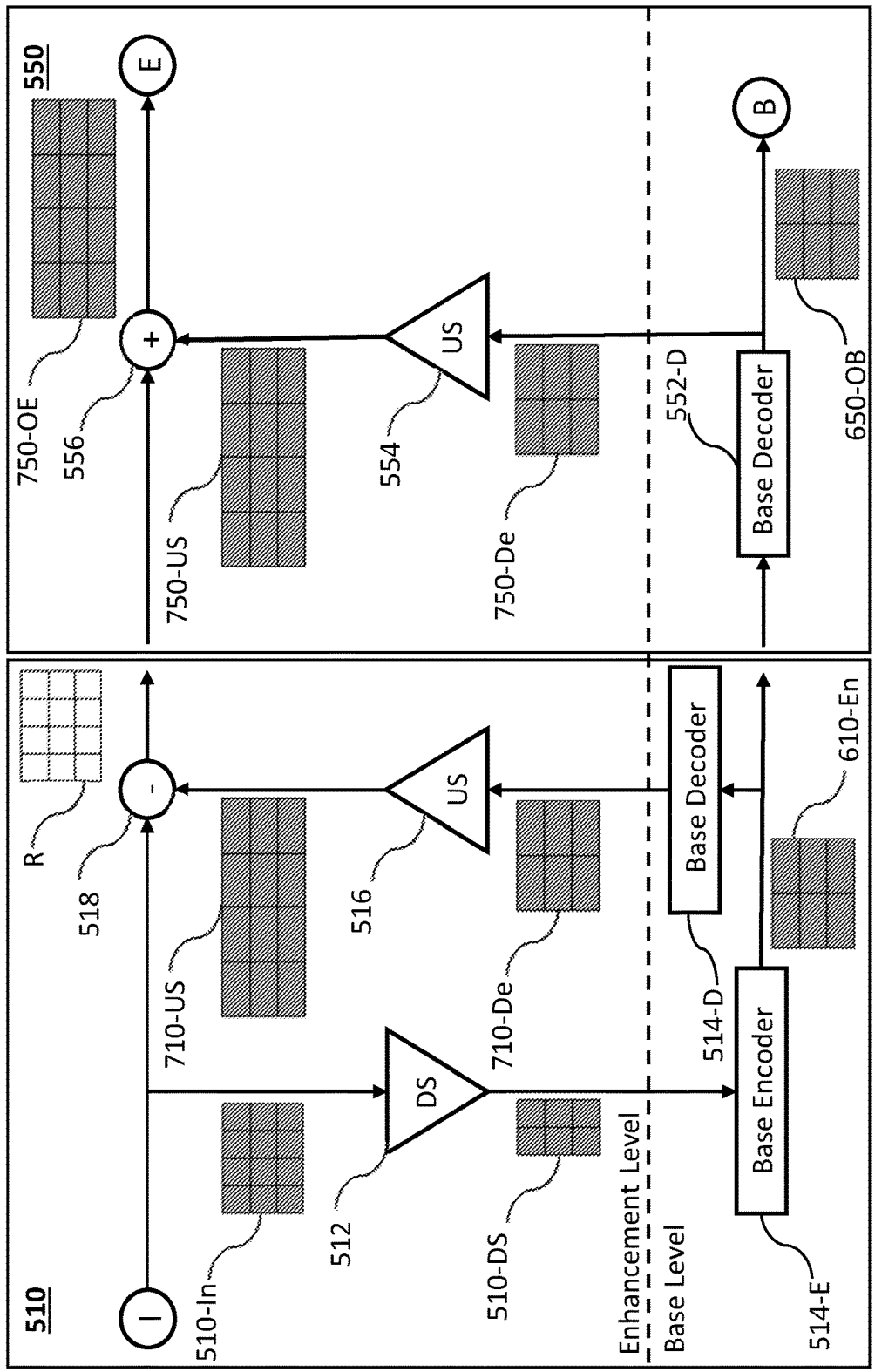
FIG. 7 is a block diagram showing the encoding system and decoding system of FIG. 6 and illustrating a further problem introduced by the modification of FIG. 6.

FIG. 7 is a block diagram showing the encoding system and decoding system of FIG. 6 and illustrating a further problem introduced by the modification of FIG. 6. Only the differences are described, and like reference signs are used. FIG. 7 follows on from FIG. 6 to show the consequences of modifying an aspect ratio of the base encoded signal 610-En in the enhancement level.

In particular, at the encoding system 510, due to the fact that the PAR of the base encoded signal 610-En has been modified or scaled, the decoded version of the base encoded signal 710-De is produced by base decoder 514-D also having the modified PAR value. After upsampling at upsampler 516, an upsampled modified decoded signal 710-US is produced having a DAR different to that of the input signal 510-In, owing to the modified PAR. However, since comparator 518 compares only the pixel values of the upsampled modified decoded signal 710-US with the input signal 510-In on a pixel-by-pixel basis, and ignores any PAR value, the fact that the two signals have a different PAR, and hence DAR, is not an issue, and residual R is produced unaffected.

At the decoding system 550, the base decoder 552-D decodes the modified base encoded signal 610-En to produce a modified decoded base signal 750-De having the modified PAR value set for example at the encoder base level. The decoded version of the modified base signal 750-De is then upsampled at upsampler 554 to produce an upsampled version of the modified decoded base signal 750-US. The upsampled signal may also retain the modified PAR value. At combine module 556, the upsampled version of the modified decoded base signal 750-US is combined with residual R to produce a modified decoded enhanced output signal 750-OE. The enhanced output signal 750-OE may retain the modified PAR value from signal 750-De and signal 750-US, and if so, will have a different DAR to the input signal 510-In at the encoding system 510 due to the different PAR values of the two signals.

Therefore, as the DAR of the base level output 650-OB of decoding system 550 is altered by modifying the PAR of the base encoded signal to match an aspect ratio with the input signal 510-In, the DAR of the enhanced level output signal 750-OE of decoding system 550 does not match the input signal 510-In.

An objective in accordance with the second aspect of the invention is, at the enhancement level output at the decoding system 550, to have the output DAR, PAR and RAR to be the same as the source signal or input signal 510-In. In one example, this means that the following relationship on the PAR applies (the subscript "o" stands for output):

$$PAR_o = PAR_s = PAR_e/(N/M) = PAR_e \times M/N \quad \text{(Equation 6)}$$

Accordingly, in this example, when a non-square down-sampling/upsampling ratio is used, the decoding system shall adjust the PAR of the final reconstructed video by a scaling factor (e.g., N/M) with respect to the PAR of the encoded base. In particular, it shall set it to be M/N times of the value of the PAR of the encoded base. For example, in the example above (i.e., in the case of a 2:1 down-sampling/up-scaling), it should divide the PAR of the final reconstructed video by 2 PAR that is signalled on the base stream and use the resulting value in the final render stage to produce the final reconstructed video.

Figure 8:
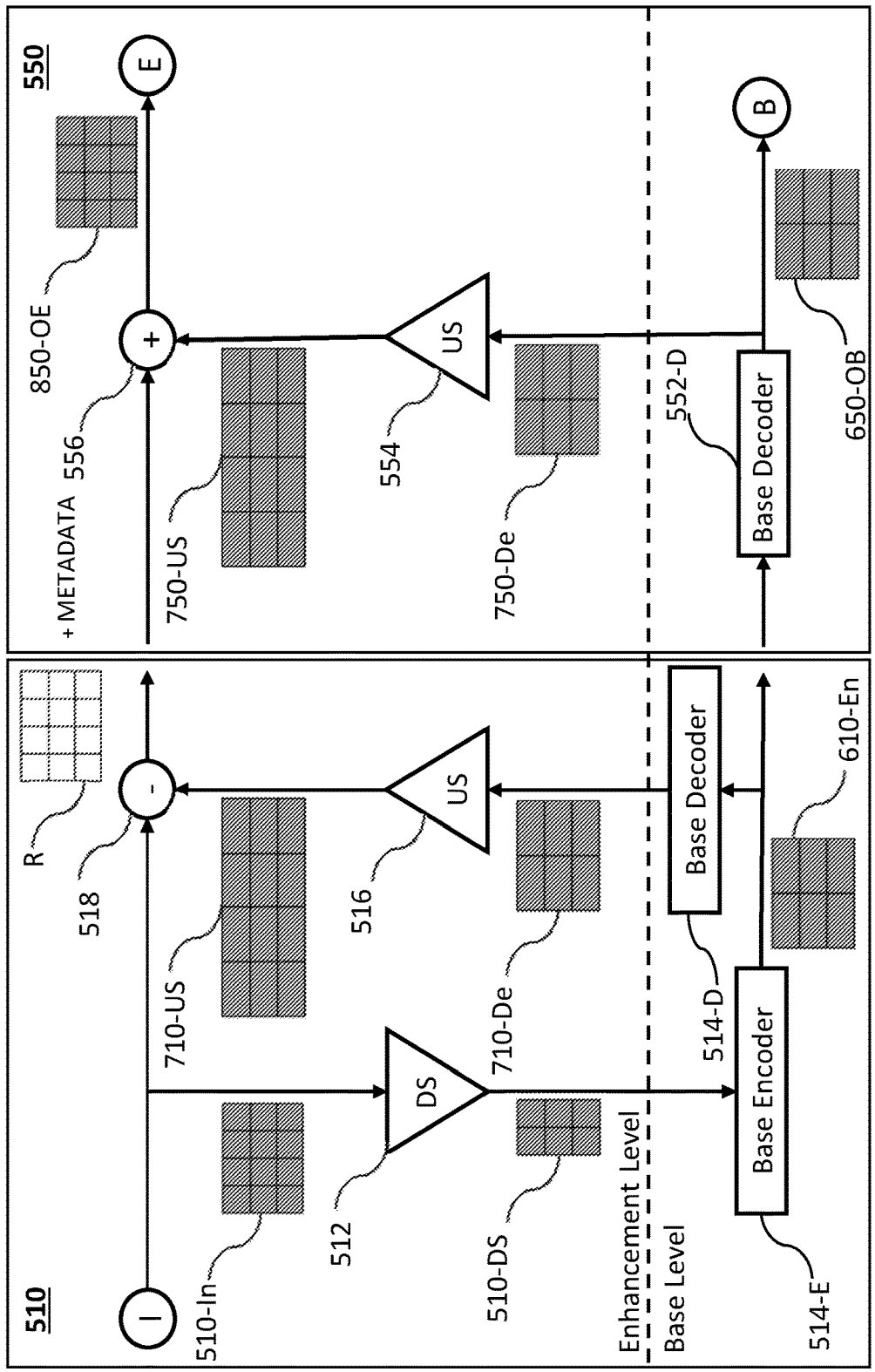
FIG. 8 is a block diagram showing the encoding system and decoding system of FIG. 6, modified according to a second aspect of the invention to control an aspect ratio of an enhanced decoded signal.

FIG. 8 is a block diagram showing the encoding system and decoding system of FIG. 6, or FIG. 7, modified according to the second aspect of the invention to control an aspect ratio of an enhanced decoded signal. Only the differences are described, and like reference signs are used.

In FIG. 8, the encoding system 510 enables the correction of an aspect ratio of the enhanced level output signal by sending the residual signal R and some metadata to enable the correction of the enhanced output signal 850-OE. The metadata comprises data that enables a decoding system to produce an enhanced reconstruction of the input signal that matches an aspect ratio of the input signal. The metadata may be sent with residual signal R as a package or separately. In this example, the metadata comprises the pixel aspect ratio of the input signal 510-In, however the metadata could comprise a scaling factor, such as the scaling factor mentioned in the paragraphs above, or could comprises the DAR of the input signal 510-In. The residual signal R and the metadata are received at decoding system 550. The metadata is used to produce a corrected output decoded signal 850-OE that has the same DAR, PAR and RAR as the input signal 510-In.

In this way, the input signal can be reconstructed at the enhancement level output in the decoding system at a same or substantially the same aspect ratio.

Figure 9:
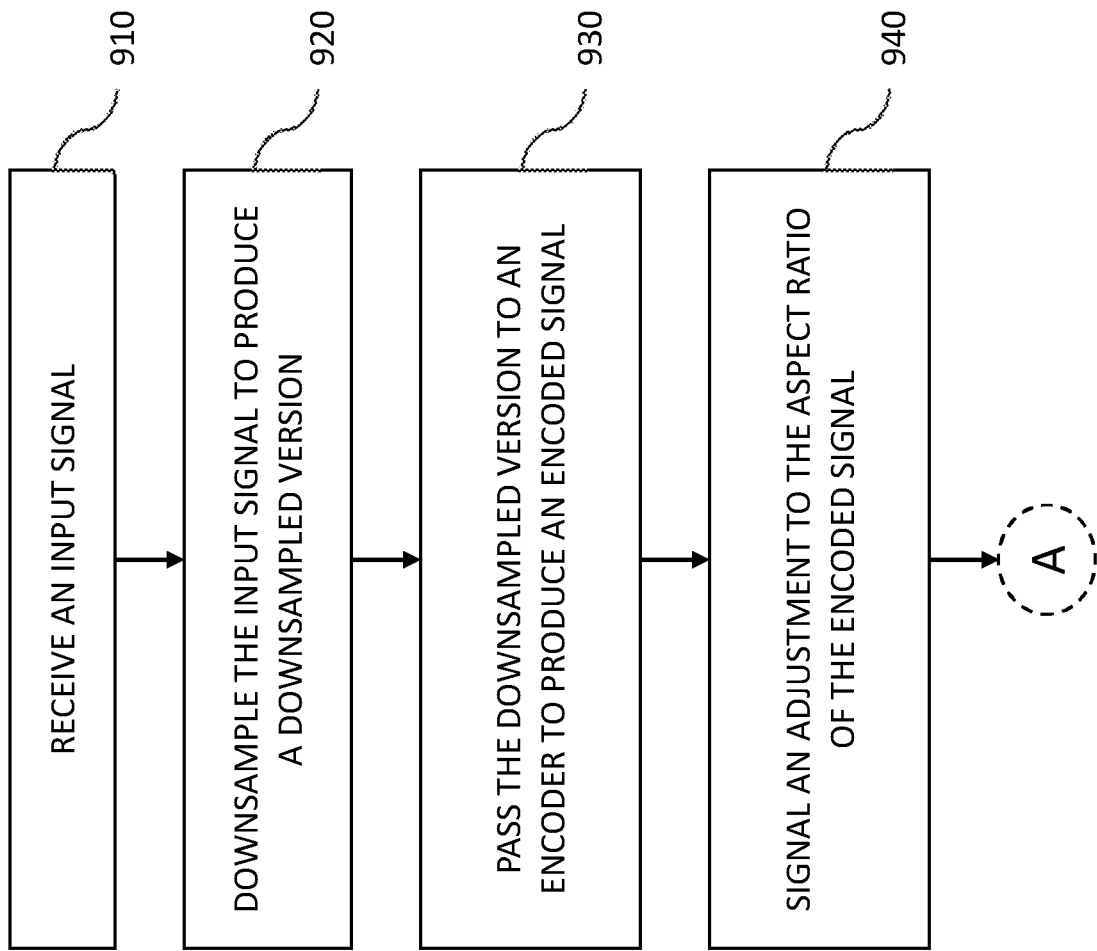
FIG. 9 is a flow chart of a method at an encoder for adjusting an aspect ratio of a base encoded signal according to the first aspect of the invention.

FIG. 9 is a flow chart of a method at an encoding system for adjusting an aspect ratio of a base encoded signal according to the first aspect of the invention. In a particular example, the encoding system is the encoding system 510 described with reference to any of FIGS. 6 to 8.

At step 910, the method comprises receiving an input signal, such as input signal 510-In. The input signal has a first resolution aspect ratio, and a first pixel aspect ratio, both as defined earlier in this description, which together define a display aspect ratio of the input signal. At step 920, the method comprises downsampling the input signal to produce a downsampled version of the input signal. At step 930, the method comprises sending the downsampled version to an encoder in the encoding system for encoding the downsampled version of the input signal to produce a first encoded signal. At step 940, the method comprises signalling an adjustment to the pixel aspect ratio of the first encoded signal. The signalling comprises a scaling factor for an adjustment to the pixel aspect ratio of the first encoded signal.

The scaling factor is derived from the resolution aspect ratio of the input signal and the resolution aspect ratio of the downsampled version. In this example method, the scaling factor is the ratio of the resolution aspect ratio of the input signal to the resolution aspect ratio of the downsampled version of the input signal. More particularly, the pixel aspect ratio of the first encoded signal is determined from the following calculation:

$$PAR_e = PAR_s \times Width_s/Width_e \times Height_e/Height_s \quad \text{(Equation 7)}$$

where $PAR_e$ is the pixel aspect ratio of the first encoded signal, $PAR_s$ is the pixel aspect ratio of the input signal, and the scaling factor is the ratio of input signal width to first encoded signal width multiplied by the ratio of first encoded signal height to input signal height, where the $height_s$ and $width_s$ in relation to the resolution aspect ratio are measured and given in pixels.

In this example method, any adjustment, or in some cases the signalling of the adjustment of the pixel aspect ratio of the first encoded signal occurs only when the downsampled version of the input signal has a different resolution aspect ratio than the input signal. This occurs when a non-square downsampling operation is used, such as in a typical example a horizontal 1D mode downsampling operation, which is described earlier in this document. When the encoding system operates in a 1D mode, in which downsampling occurs only across the horizontal dimension of the signal by a ratio of 2:1, the scaling factor increases the pixel aspect ratio of the first encoded signal by scaling the horizontal dimension by a factor of 2, and by not scaling the height dimension.

In this example method, the pixel aspect ratio is adjusted. In this way, a convenient and easy-to-signal aspect ratio is used. Alternatively, a display aspect ratio may be signalled and adjusted. Indeed, the signalling of the adjustment causes the display aspect ratio of the first encoded signal to be substantially the same as the display aspect ratio of the input signal.

The step of signalling the adjustment comprises signalling to set the pixel aspect ratio of the first encoded signal to an encoding module performing the first encoding method. Alternatively, the method may adjust the downsampled version prior to sending the downsampled version to the encoder to create the first encoded signal.

The scaling factor in this example is the ratio of the resolution aspect ratio of the input signal to the resolution aspect ratio of the downsampled version of the input signal, see Equation 7 for example. In this way, the display aspect ratio of the input signal can be maintained through the coding pipeline even after downsampling and encoding.

In this example, the method may also comprise upsampling a decoded version of the first encoded signal to produce an upsampled decoded signal. The first encoded signal may be received from and decoded using a first decoding method corresponding to the first encoding method to produce the decoded version. The method also comprises producing a residual signal based on a comparison between the input signal and the upsampled decoded signal and the method may comprise outputting the residual signal and the pixel aspect ratio of the input signal, or information that would allow the same to be derived, for use by a decoding decoding system.

In this way, the residual signal can add an enhancement to the first encoded signal at a decoding system, such as the decoding system 550 described with reference to FIGS. 6 to 8. Also, the information comprising the pixel aspect ratio of the input signal can be used at the decoding system to manage or correct any issues that the decoding system may encounter owing to non-square downsampling or upsampling operations, or other aspect ratio management signalling and adjustments that may have occurred at an encoding system or at the decoding system.

The information, or metadata, that would allow the pixel aspect ratio of the input signal to be known may be the display aspect ratio of the input signal, as it is very likely that the resolution aspect ratio of an upsampled decoded signal in a properly functioning decoding system would match the input signal.

In the hierarchical coding scheme, the upsampling operation of the hierarchical coding scheme is a non-square upsampling operation corresponding to the downsampling operation. The method only outputs the metadata when one of the downsampling operation or the upsampling operation of the hierarchical coding scheme is a non-square upsampling operation. However, a scaling factor or ratio of 1:1 may be applied for square downsampling/upsampling set ups.

In a typical variation of the above method, the method may comprise encoding the residual signal using a second encoding method prior to outputting the same.

The metadata is typically transmitted with the residual signal but may be transmitted independently of the residual signal or the first encoded signal, or in any other way. The Signalling section at the end of the description discusses suitable signalling of aspect ratios.

Figure 10:
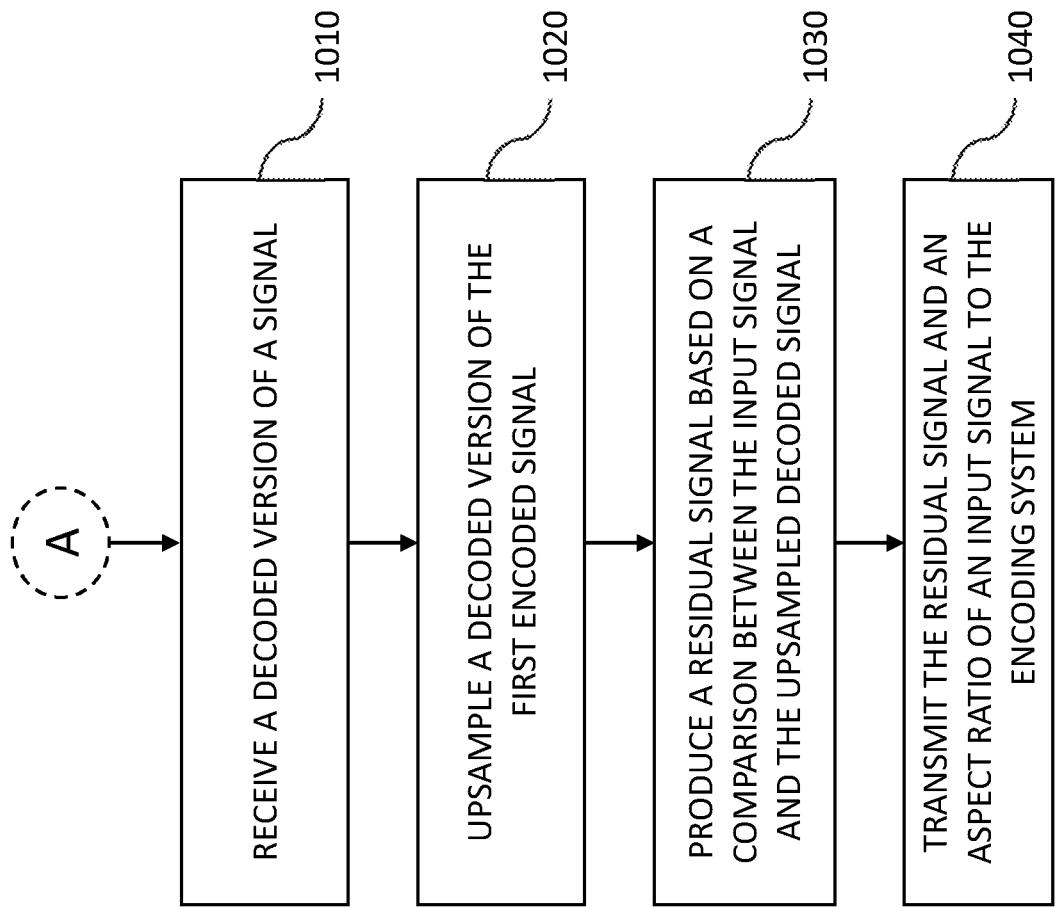
FIG. 10 is a flow chart of a method at an encoder for controlling an aspect ratio of an enhanced level output at a decoder, according to the second aspect of the invention.

FIG. 10 is a flow chart of a method at an encoding system for managing an aspect ratio of an enhanced level output at a decoding system, according to the second aspect of the invention. In a particular example, the encoding system is the encoding system 510 described with reference to FIG. 8. The method of FIG. 10 generally follows on from the method of FIG. 9 as indicated by connector label A, however this is not necessary.

At step 1010, the method comprises receiving a decoded version of a signal. At step 1020, the method comprises upsampling the decoded version of the signal to produce an upsampled decoded signal. At step 1030, the method comprises producing a residual signal based on a comparison between an input signal and the upsampled decoded signal. At step 1140, the method comprises outputting the residual signal and an aspect ratio of the input signal.

In the example method described, the aspect ratio of the input signal is the pixel aspect ratio. However, other data may be signalled to the decoding system to allow the decoding system to reproduce the input signal aspect ratio more faithfully, such as a display aspect ratio of the input signal.

Figure 11:
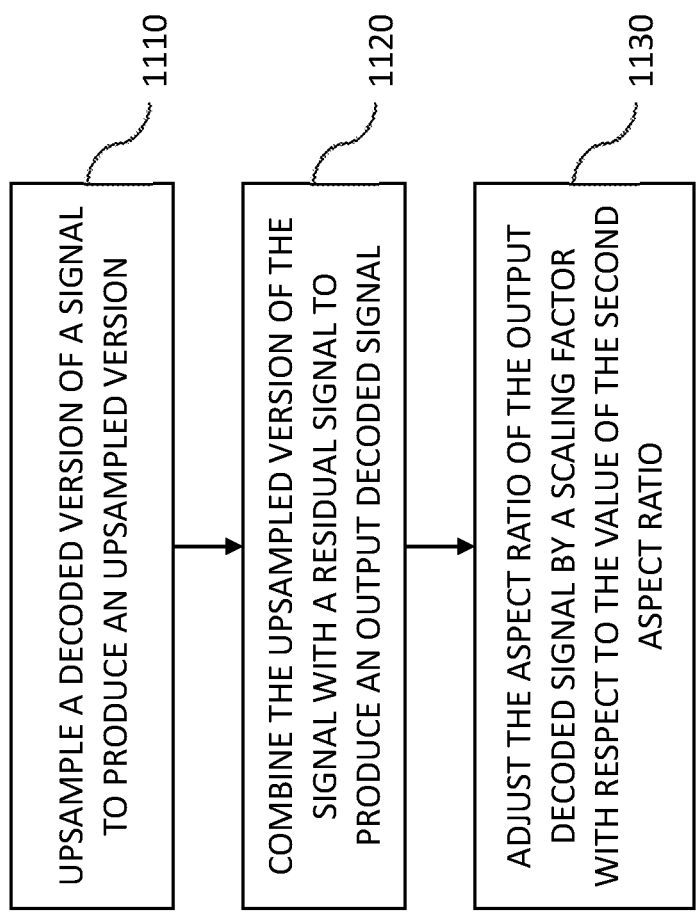
FIG. 11 is a flow chart of a method at a decoder to control an aspect ratio of an enhanced level output, according to the second aspect of the invention.

FIG. 11 is a flow chart of a method at a decoding system to control an aspect ratio of an enhanced level output, according to the second aspect of the invention. In a particular example, the decoding system is the decoding system 550 described with reference to FIG. 8.

At step 1110, the method comprises upsampling a decoded version of a signal to produce an upsampled version of the signal. At step 1120, the method comprises combining the upsampled version of the signal with a residual signal to produce an output decoded signal.

At step 1130, the method comprises adjusting the aspect ratio of the output decoded signal by a scaling factor. In particular, the adjustment is made so that the output decoded signal matches, as far as possible, the overall shape and aspect ratio of the originally encoded signal at the encoding system side of the coding pipeline.

The aspect ratio of the output decoded signal is typically a pixel aspect ratio. In this way, the pixel aspect ratio of the output decoded signal can be modified so that the output decoded signal has a similar display aspect ratio to the input signal. However, other data may be signalled to the decoding system to allow the decoding system to reproduce the input signal aspect ratio more faithfully, such as a display aspect ratio of the input signal.

Typically, the adjustment uses a pixel aspect ratio, or a desired display aspect ratio received as metadata from an encoding system. The display aspect ratio is the aspect ratio of a signal when rendered on a display, and which is derivable from the pixel aspect ratio and a resolution aspect ratio as described earlier in this disclosure with reference to Equation 1. The adjustment causes the pixel aspect ratio or display aspect ratio of the output decoded signal to match the received information. However, the adjustment may instead use a scaling factor derived from the upsampling operation.

The scaling factor is the ratio of the resolution aspect ratio of the decoded version to the resolution aspect ratio of the upsampled version of the signal and may be derived using the scaling factor described earlier in the disclosure.

In some variations, the metadata or scaling factor is used to cause the output decoded signal to be adjusted only when the upsampling operation is non-square and causes a change to the resolution aspect ratio of the upsampled signal.

In this example method, the residual signal is a decoded component of the signal, said decoded component of the signal decoded using a second decoding method.

Figure 12:
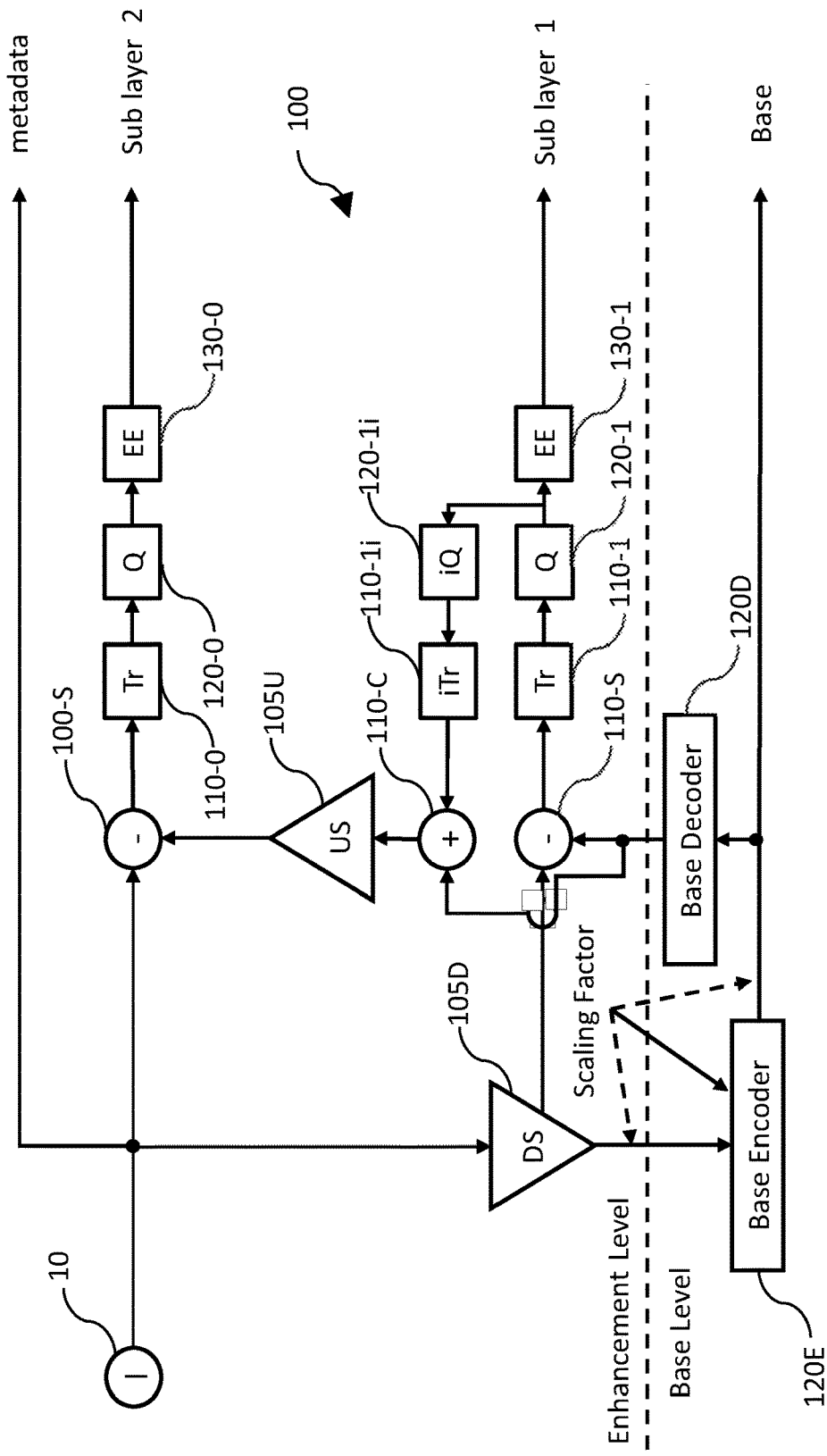
FIG. 12 is a block diagram of the encoding system of FIG. 1, modified according to the first aspect of the invention and the second aspect of the invention.

FIG. 12 is a block diagram of the encoding system of FIG. 1, modified according to the first aspect of the invention and the second aspect of the invention. Only the differences are described.

In FIG. 12, the base encoded signal is modified by signalling the scaling an aspect ratio of the base encoded signal by a scaling factor N/M according to the first aspect of the invention. As demonstrated by the three arrows originating from the scaling factor N/M, the scaling factor may be signalled and then applied at one of three locations in the encoding pipeline as follows: 1) by adjusting the pixel aspect ratio of the output of the downsampler 105D by the scaling factor before said output is sent for encoding at the base encoder 120E, 2) by signalling the adjustment and the scaling factor to the base encoder 120E such that the pixel aspect ratio produced base encoded signal is scaled by the scaling factor at the base encoder 120E, or 3) by scaling an aspect ratio of the base encoded signal after its production at the base encoder 120E. As already mentioned, the modified base encoded signal is then sent to a decoding system, together with the enhancement level information as needed.

In addition, metadata is also sent from the encoding system 100 according to the second aspect of the invention to compensate for the modified base encoded signal. The metadata comprises data that enables a decoding system to produce an enhanced reconstruction of the input signal that matches an aspect ratio of the input signal, despite the scaling factor that has been applied at the base level. The metadata may be sent with the encoded signal data, (i.e. sub layer 2, sub layer 1 and base) as a package. The metadata may be signalled with sub layer 2 in one example. In another example, the metadata is signalled separately from the encoded signal data, and for example can be sent on an independent communications channel or stored on a storage media separately from the encoded signal data. The metadata may comprise the pixel aspect ratio of the input signal or in some circumstances the display aspect ratio of the input signal.

Figure 13:
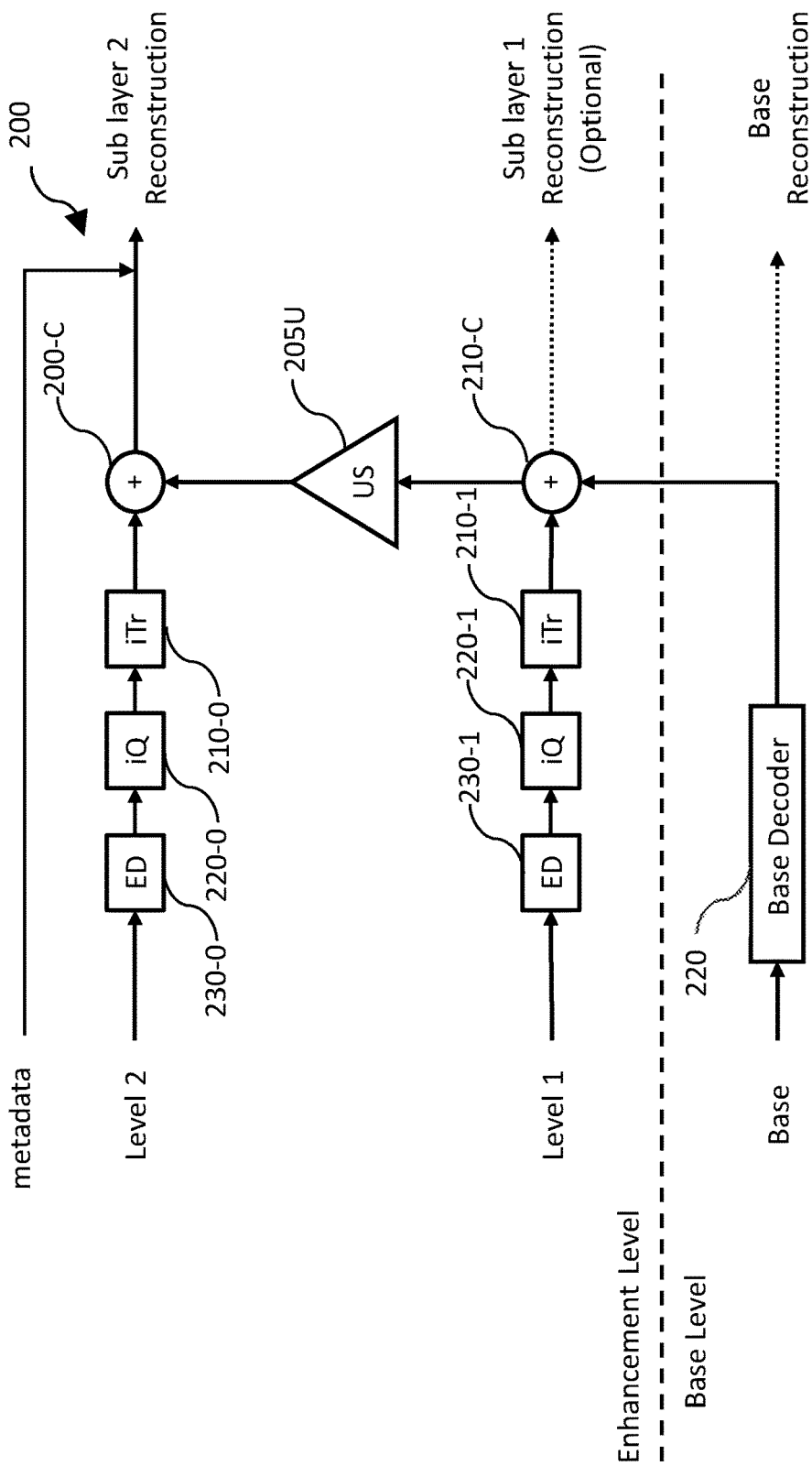
FIG. 13 is a block diagram of the decoding system of FIG. 2 modified according to the second aspect of the invention.

FIG. 13 is a block diagram of the decoding system of FIG. 2 modified according to the second aspect of the invention. Only the differences are described.

Decoding system 200 receives the modified base encoded signal and base decoder decodes it to produce a base reconstruction that when displayed has a display aspect ratio that matches or substantially matches the display aspect ratio of the input signal to the encoding system.

In addition, the decoding system 200 receives the metadata sent from the encoding system, as described with reference to FIG. 12, to produce a sub layer 2 reconstruction that has a display aspect ratio that matches or substantially matches the display aspect ratio of the input signal. Alternatively, the decoding system 200 derives a scaling factor as discussed in relation to FIG. 11.

Signalling

In the above examples, when a non-square downsampling/upsampling ratio is used, the base encoder sets in the sequence parameters set (SPS) video usability information (VUI) of the base to an aspect ratio that is N/M times that of the source video.

In the above examples, when a non-square downsampling/upsampling ratio is used, the decoding system sets the final reconstructed video (i.e. the resulting output picture) to have a PAR that is M/N of the value of the PAR that is signalled in the base stream.

In an embodiment relative to MPEG-5 LCEVC as described in F. Maurer, S. Battista, L. Ciccarelli, G. Meardi, S. Ferrara "Overview of MPEG-5 Part 2—Low Complexity Enhancement Video Coding (LCEVC)", ITU Journal: ICT Discoveries, Vol. 3(1), 8 Jun. 2020 and "MPEG-5 part 2: Low Complexity Enhancement Video Coding (LCEVC): Overview and performance evaluation", Proc. SPIE 11510, Applications of Digital Image Processing XLIII, 115101C (21 Aug. 2020); https://doi.org/10.1117/12.2569246 and further in the International Standard ISO/IEC 23094-2 (whose specification "Draft Text of ISO/IEC DIS 23094-2 Low Complexity Enhancement Video Coding", ISO/IEC WG11, w18986, Brussels, January 2020. is included herein by reference), in case of a encoding with either scaling_mode_level1 or scaling_mode_level2 equal to 1, for one-dimensional 2:1 scaling only across the horizontal dimension, in order to maintain the source display aspect ratio, it is recommended that the bitstream signals the sample aspect ratio in the Video Usability Information (VUI) and that the base encoder doubles the horizontal value of the sample aspect ratio, as signalled in the Video Usability Information (VUI), for each scaling_mode_level equal to 1.

In an embodiment relative to MPEG-5 LCEVC as described in F. Maurer, S. Battista, L. Ciccarelli, G. Meardi, S. Ferrara "Overview of MPEG-5 Part 2—Low Complexity Enhancement Video Coding (LCEVC)", ITU Journal: ICT Discoveries, Vol. 3(1), 8 Jun. 2020 and "MPEG-5 part 2: Low Complexity Enhancement Video Coding (LCEVC): Overview and performance evaluation", Proc. SPIE 11510, Applications of Digital Image Processing XLIII, 115101C (21 Aug. 2020); https://doi.org/10.1117/12.2569246 and further in the International Standard ISO/IEC 23094-2 (whose specification "Draft Text of ISO/IEC DIS 23094-2 Low Complexity Enhancement Video Coding", ISO/IEC WG11, w18986, Brussels, January 2020. is included herein by reference), the Sample Aspect Ratio that is applicable to the enhanced picture output of the decoding system, is the one signalled in the bitstream VUI, as specified in Annex E of "Draft Text of ISO/IEC DIS 23094-2 Low Complexity Enhancement Video Coding", ISO/IEC WG11, w18986, Brussels, January 2020, and carried in payload type equal to 5 (Table 7 section 7.3.3), additional type equal to 1 for VUI parameters (section 7.3.10 and 7.4.3.8). Should additional info or vui parameters or aspect ratio information not be present, the decoding system shall assume an aspect_ratio_idc value of 1, for a 1:1 sample aspect ratio ("square" sample).

In addition, in ISO Base Media File Format (aka MP4), the aspect ratio may be signalled in the atom named "pasp", in the form of unsigned integers numerator and denominator. As such, an encoding system may signal the aspect ratio in the atom named "pasp", in the form of unsigned integers numerator and denominator.

In addition, in MPEG-TS, the aspect ratio may be signalled in the "Target background grid descriptor" where it is defined as an enumeration from the MPEG-2 Video specification. As such, an encoding system may signal the aspect ratio may be signalled in the "Target background grid descriptor" where it is defined as an enumeration from the MPEG-2 Video specification.

In an embodiment, if a decoding system receives an aspect ratio at container level (e.g., MPEG-TS or ISO BMFF) which is different from that indicated in the base bitstream, the decoder may choose to use the one of the base bitstream.

Computer programs, and computer readable storage media, are also disclosed which can perform any of the aforesaid methods when implemented on a general purpose computer system performing the function of an encoding system or encoder, or a decoding system or a decoder, and which can provide functionality described as enhancement level functionality, or both enhancement level and base level functionality, in this disclosure.

The specific examples, generally, are described with reference to example video signals in which there are pixels and frames as would be understood by the skilled person. Of course, the signals may relate to non-video signals where a displayed, or otherwise, aspect ratio is important to signal reproduction. In this case, the skilled person is taught that a sample aspect ratio, or other equivalent aspect ratio instead of a pixel aspect ratio, may be managed and scaled throughout a coding pipeline in the same way as disclosed in this document.

The above embodiments are to be understood as illustrative examples. Further embodiments are envisaged. It is to be understood that any feature described in relation to any one embodiment may be used alone or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

Additional Statements

There is provided a method of encoding an input signal using a hierarchical coding scheme, wherein the scheme comprises encoding a downsampled version of the input signal using a first encoding method to produce a first encoded signal, the input signal having a first aspect ratio, the method comprising: adjusting the aspect ratio of the first encoded signal by a scaling factor with respect to value of aspect ratio of the input signal.

Optionally, wherein the adjustment is performed when the downsampled version of the input signal has a different aspect ratio than the input signal.

Optionally, wherein the step of adjusting comprises setting the aspect ratio of the first encoded signal by scaling the aspect ratio of the input signal by the scaling factor.

There is provided an encoding module configured to perform the steps of any one of the above encoding steps.

There is provided a method of decoding a signal using a hierarchical coding scheme, wherein the scheme comprises upsampling a decoded version of the signal to produce an upsampled version of the signal, said decoded version of the signal decoded using a first decoding method, and combining the upsampled version of the signal with a decoded component of the signal to produce an output decoded signal, said decoded component of the signal decoded using a second decoding method, the signal having a first aspect ratio and decoded version of the signal having a second aspect ratio, the method comprising: adjusting the aspect ratio of the output decoded signal by a scaling factor with respect to value of the second aspect ratio.

Optionally, wherein the adjustment is performed when the first aspect ratio is different from the second aspect ratio.

Optionally, wherein the step of adjusting comprises setting the aspect ratio of the output decoded signal by scaling the aspect ratio of the second aspect ratio by the scaling factor.

There is provided a decoding module configured to perform the steps of any one of the above decoding steps.

What is claimed is:

1. A method of signalling a signal adjustment when encoding an input signal using a hierarchical coding scheme to manage a display aspect ratio, wherein the hierarchical coding scheme comprises encoding a downsampled version of the input signal using a first encoding method to produce a first encoded signal, the method comprising:
when the downsampling operation of the hierarchical coding scheme is a non-square downsampling operation, signalling an adjustment to cause a pixel aspect ratio of the first encoded signal to be adjusted by a scaling factor, wherein the scaling factor is determined from the non-square downsampling operation, and a pixel aspect ratio is the ratio of the width and the height of each pixel in the signal,
wherein the pixel aspect ratio of the first encoded signal is determined from the following equation:

$$PAR_e = PAR_s \times Width_s/Width_e \times Height_e/Height_s$$

where $PAR_e$ is the pixel aspect ratio of the first encoded signal, $PAR_s$ is the pixel aspect ratio of the input signal, and the scaling factor is the ratio of input signal width, $Width_s$, to first encoded signal width, $Width_e$, multiplied by the ratio of first encoded signal height, $Height_e$, to input signal height, $Height_s$.

2. The method of claim 1, wherein the non-square downsampling operation results in a change to the resolution aspect ratio from the input signal to the downsampled version of the input signal, wherein the resolution aspect ratio is the ratio between the width in pixels and the height in pixels of each frame in the signal.

3. The method of claim 1, wherein the scaling factor is the ratio of the resolution aspect ratio of the input signal to the resolution aspect ratio of the downsampled version of the input signal.

4. The method of claim 1, wherein, when an encoding system operates in a 1D mode, in which downsampling occurs only across the horizontal dimension of the signal by a ratio of X:1, the scaling factor increases the pixel aspect ratio of the first encoded signal by scaling the horizontal dimension of each pixel by a factor of X, and by not scaling the height dimension.

5. The method of claim 1, wherein the signalling of the adjustment causes the display aspect ratio of the first encoded signal to be substantially the same as the display aspect ratio of the input signal.

6. The method of claim 1, wherein the step of signalling the adjustment comprises signalling to set the pixel aspect ratio of the first encoded signal to an encoding module performing the first encoding method.

7. The method of claim 1, wherein the hierarchical coding scheme further comprises:
upsampling a decoded version of the first encoded signal to produce an upsampled decoded signal, wherein the first encoded signal is decoded using a first decoding method corresponding to the first encoding method;

producing a residual signal based on a comparison between the input signal and the upsampled decoded signal; and outputting the residual signal;

wherein the method further comprises outputting metadata for a decoding system, the metadata comprising information relating to a pixel aspect ratio of the input signal.

8. The method of claim 7, wherein the metadata comprises information relating to a display aspect ratio of the input signal.

9. The method of claim 7 wherein the metadata comprises the pixel aspect ratio of the input signal.

10. The method of claim 7, wherein, in the hierarchical coding scheme, the upsampling operation of the hierarchical coding scheme is a non-square upsampling operation corresponding to the downsampling operation.

11. The method of claim 7, wherein the method only outputs the metadata when one of the downsampling operation and the upsampling operation of the hierarchical coding scheme is non-square.

12. The method of claim 7, wherein the method comprises encoding the residual signal using a second encoding method prior to outputting.

13. The method of claim 7, wherein the metadata is transmitted with the residual signal.

14. A method of adjusting a decoded signal, the decoded signal being decoded using a hierarchical coding scheme, wherein the hierarchical coding scheme comprises upsampling a decoded version of an encoded signal to produce an upsampled version of the signal, said decoded version of the signal decoded using a first decoding method, and combining the upsampled version of the signal with a residual signal to produce an output decoded signal, the encoded signal being derived from an input signal, the method comprising:

adjusting a pixel aspect ratio of the output decoded signal so that the pixel aspect ratio of the output decoded signal matches that of the input signal, the adjustment using one of:

a pixel aspect ratio or a desired display aspect ratio received as metadata from an encoding system, wherein a display aspect ratio is the aspect ratio of a signal when rendered on a display, and which is derivable from the pixel aspect ratio and a resolution aspect ratio; and a scaling factor derived from the upsampling operation, wherein the pixel aspect ratio of the decoded signal is determined from the following equation:

$$PAR_e = PAR_s \times Width_s / Width_e \times Height_e / Height_s$$

where $PAR_e$ is the pixel aspect ratio of the decoded signal, $PAR_s$ is the pixel aspect ratio of the input signal, and the scaling factor is the ratio of input signal width, $Width_s$, to decoded signal width, $Width_e$, multiplied by the ratio of decoded signal height, $Height_e$, to input signal height, $Height_s$.

15. The method of claim 14, wherein the metadata comprises the pixel aspect ratio of the input signal, and the adjustment matches the pixel aspect ratio of the output decoded signal to the pixel aspect ratio of the input signal.

16. The method of claim 14, wherein the scaling factor is the ratio of the resolution aspect ratio of the decoded version to the resolution aspect ratio of the upsampled version of the signal.

17. The method of claim 14, wherein the metadata or scaling factor is used to cause the output decoded signal to be adjusted only when the upsampling operation is non-square and causes a change to the resolution aspect ratio of the output decoded signal as it passes through the upsampling operation.

18. The method of claim 14, wherein the residual signal is a separate decoded component of the signal, said separate decoded component of the signal decoded using a second decoding method.

19. A method of adjusting signals in a hierarchical coding scheme, wherein the hierarchical coding scheme comprises:

at an encoding system:

downsampling an input signal to produce a downsampled version;

passing the downsampled version to an encoder so that the encoder produces a first encoded signal;

receiving a first decoded version of the first encoded signal from a decoder in the encoding system;

upsampling the decoded version to produce an encoder-side reconstruction of the input signal;

comparing the encoder-side reconstruction with the input signal to produce a residual signal;

outputting the residual signal for a decoding system to use with the first encoded signal;

at a decoding system:

receiving a second decoded version of the first encoded signal from a decoder in the decoding system;

upsampling the second decoded version to produce a decoder-side reconstruction of the input signal;

receiving the residual signal and adding the residual signal to the decoder-side reconstruction to produce a decoded output signal;

wherein the method comprises, at the encoding system:

signalling an adjustment in the encoding system to cause a pixel aspect ratio of the first encoded signal to be adjusted by a scaling factor, wherein the scaling factor is determined from a resolution aspect ratio change caused by the downsampling operation, wherein the pixel aspect ratio is the ratio between the width and the height of each pixel in the signal, and the resolution aspect ratio is the ratio between the width and the height of each picture in the signal;

outputting metadata for a decoding system to use when using the residual signal, the metadata comprising the pixel aspect ratio of the input signal or information that allows a decoding system to derive the pixel aspect ratio;

wherein the method comprises, at the decoding system:

adjusting a pixel aspect ratio of the output decoded signal using the metadata so that the corresponding display aspect ratio for the output decoded signal when rendered on a display matches that of the input signal, wherein the display aspect ratio is the aspect ratio of a signal when rendered on a display, and is derivable from the pixel aspect ratio multiplied by the resolution aspect ratio of a signal, wherein the pixel aspect ratio of the first encoded signal is determined from the following equation:

$$PAR_e = PAR_s \times Width_s / Width_e \times Height_s / Height_e$$

where $PAR_e$ is the pixel aspect ratio of the first encoded signal, $PAR_s$ is the pixel aspect ratio of the input signal, and the scaling factor is the ratio of input signal width, $Width_s$, to first encoded signal width, $Width_e$, multiplied by the ratio of first encoded signal height, $Height_e$, to input signal height, $Height_s$.

* * * * *